US008892626B2

(12) United States Patent
Kakivaya et al.

(10) Patent No.: US 8,892,626 B2
(45) Date of Patent: Nov. 18, 2014

(54) ORGANIZING RESOURCES INTO COLLECTIONS TO FACILITATE MORE EFFICIENT AND RELIABLE RESOURCE ACCESS

(75) Inventors: Gopala Krishna R. Kakivaya, Sammamish, WA (US); Richard L. Hasha, Seatlle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/599,742

(22) Filed: Aug. 30, 2012

(65) Prior Publication Data

US 2012/0331122 A1    Dec. 27, 2012

Related U.S. Application Data

(63) Continuation of application No. 12/556,399, filed on Sep. 9, 2009, now Pat. No. 8,307,028, which is a continuation of application No. 10/956,472, filed on Sep. 30, 2004, now Pat. No. 7,613,703.

(51) Int. Cl.
| | |
|---|---|
| *G06F 15/16* | (2006.01) |
| *G06F 15/177* | (2006.01) |
| *G06F 15/173* | (2006.01) |
| *H04L 29/12* | (2006.01) |
| *G06F 17/30* | (2006.01) |

(52) U.S. Cl.
CPC ...... *G06F 17/30067* (2013.01); *H04L 61/3015* (2013.01); *H04L 29/12132* (2013.01); *H04L 61/1552* (2013.01); *Y10S 707/99944* (2013.01); *Y10S 707/99943* (2013.01); *H04L 29/12594* (2013.01); *Y10S 707/99948* (2013.01); *Y10S 707/99931* (2013.01); *Y10S 707/99945* (2013.01)
USPC ........... 709/201; 709/217; 709/218; 709/219; 709/220; 709/221; 709/222; 709/238; 709/239; 709/240; 709/241; 709/242; 709/243; 709/244; 707/999.103; 707/999.102; 707/999.107; 707/999.001; 707/999.104

(58) Field of Classification Search
CPC ............. H04L 67/327; H04L 67/1002; H04L 67/1029; H04L 64/1095; H04L 67/16; H04L 41/044; G06F 9/5083
USPC ......... 709/217–219, 220, 222, 238–244, 201, 709/245
See application file for complete search history.

(56) References Cited

U.S. PATENT DOCUMENTS

| | | |
|---|---|---|
| 5,483,652 A | 1/1996 | Sudama |
| 5,692,180 A | 11/1997 | Lee |

(Continued)

FOREIGN PATENT DOCUMENTS

| | | |
|---|---|---|
| EP | 1052805 | 11/2000 |
| EP | 1650911 | 4/2006 |

(Continued)

OTHER PUBLICATIONS

Office Action dated Dec. 24, 2012 cited in U.S. Appl. No. 13/599,681.

(Continued)

*Primary Examiner* — Edward Kim
(74) *Attorney, Agent, or Firm* — Ben Tabor; David Andrews; Micky Minhas

(57) ABSTRACT

Resources are organized into collections to facilitate more efficient and reliable resource access. Namespace managers communicate with one another to form a federation namespace infrastructure. The infrastructure efficiently routes, migrates, and processes namespace requests, such as, for example, namespace registration requests from providers requesting to manage portions of namespaces and lookup requests from consumers requesting access to managed resources. Resources are registered in and made accessible from multiple different namespaces. Resources are identified using nested queries that filter results at multiple levels of a hierarchical namespace.

18 Claims, 12 Drawing Sheets

(56) References Cited

U.S. PATENT DOCUMENTS

| | | | |
|---|---|---|---|
| 5,831,975 | A | 11/1998 | Chen et al. |
| 5,893,116 | A | 4/1999 | Simmonds |
| 6,061,743 | A | 5/2000 | Thatcher |
| 6,085,086 | A * | 7/2000 | La Porta et al. ............ 455/432.3 |
| 6,381,627 | B1 | 4/2002 | Kwan |
| 6,411,966 | B1 | 6/2002 | Kwan |
| 6,505,244 | B1 | 1/2003 | Natarajan |
| 6,546,415 | B1 | 4/2003 | Park |
| 6,553,423 | B1 | 4/2003 | Chen |
| 6,665,702 | B1 | 12/2003 | Zisapel |
| 6,701,415 | B1 * | 3/2004 | Hendren, III ................. 711/138 |
| 6,807,423 | B1 | 10/2004 | Armstrong |
| 6,826,182 | B1 | 11/2004 | Parthasarathy |
| 6,848,109 | B1 | 1/2005 | Kuhn |
| 6,956,821 | B2 | 10/2005 | Szviatovszki |
| 6,965,575 | B2 | 11/2005 | Srikrishna |
| 7,010,534 | B2 | 3/2006 | Kraft |
| 7,016,085 | B2 | 3/2006 | Gonzalez |
| 7,058,639 | B1 * | 6/2006 | Chatterjee et al. ..................... 1/1 |
| 7,062,563 | B1 | 6/2006 | Lewis et al. |
| 7,065,784 | B2 | 6/2006 | Hopmann |
| 7,072,982 | B2 | 7/2006 | Teodosiu |
| 7,152,180 | B2 | 12/2006 | Shoab |
| 7,188,145 | B2 | 3/2007 | Lowery |
| 7,200,113 | B2 | 4/2007 | Beyda |
| 7,200,657 | B2 * | 4/2007 | Adams et al. ................. 709/224 |
| 7,200,675 | B2 | 4/2007 | Wang |
| 7,206,934 | B2 | 4/2007 | Pabla |
| 7,209,973 | B2 | 4/2007 | Tormasov |
| 7,310,314 | B1 | 12/2007 | Katz |
| 7,328,280 | B2 | 2/2008 | Takeda |
| 7,337,465 | B2 | 2/2008 | Kiyoto |
| 7,379,994 | B2 | 5/2008 | Collazo |
| 7,463,648 | B1 | 12/2008 | Eppstein |
| 7,496,602 | B2 | 2/2009 | Kaler |
| 7,613,703 | B2 | 11/2009 | Kakivaya |
| 7,831,641 | B2 * | 11/2010 | Wong et al. .................... 707/822 |
| 8,275,823 | B2 | 9/2012 | Belveze |
| 2002/0056089 | A1 | 5/2002 | Houston |
| 2002/0143855 | A1 | 10/2002 | Traversat |
| 2002/0152299 | A1 | 10/2002 | Traversat |
| 2002/0184310 | A1 | 12/2002 | Traversat |
| 2002/0184368 | A1 * | 12/2002 | Wang ............................ 709/226 |
| 2003/0018701 | A1 | 1/2003 | Kaestle |
| 2003/0074413 | A1 | 4/2003 | Nielsen |
| 2003/0081617 | A1 | 5/2003 | Deng |
| 2003/0088620 | A1 | 5/2003 | Kermarrec |
| 2003/0126304 | A1 | 7/2003 | Wyatt |
| 2003/0131246 | A1 | 7/2003 | Reeves et al. |
| 2003/0177183 | A1 | 9/2003 | Cabrera |
| 2003/0195984 | A1 | 10/2003 | Zisapel |
| 2003/0233455 | A1 | 12/2003 | Leber |
| 2004/0054807 | A1 * | 3/2004 | Harvey et al. ................. 709/243 |
| 2004/0064548 | A1 * | 4/2004 | Adams et al. ................. 709/224 |
| 2004/0083305 | A1 | 4/2004 | Wang et al. |
| 2004/0098455 | A1 | 5/2004 | Ellis |
| 2004/0133640 | A1 | 7/2004 | Yeager |
| 2004/0148326 | A1 | 7/2004 | Nadgir |
| 2004/0162871 | A1 | 8/2004 | Pabla |
| 2004/0162997 | A1 | 8/2004 | Hopmann |
| 2004/0168084 | A1 * | 8/2004 | Owen et al. .................... 713/201 |
| 2004/0181588 | A1 * | 9/2004 | Wang et al. .................... 709/207 |
| 2004/0181689 | A1 | 9/2004 | Kiyoto et al. |
| 2004/0205124 | A1 | 10/2004 | Limprecht |
| 2004/0236945 | A1 | 11/2004 | Risan et al. |
| 2004/0249953 | A1 | 12/2004 | Fernandez |
| 2005/0010660 | A1 | 1/2005 | Vaught |
| 2005/0021617 | A1 | 1/2005 | Rusitschka |
| 2005/0028166 | A1 | 2/2005 | Chew |
| 2005/0044301 | A1 | 2/2005 | Vasilevsky |
| 2005/0091505 | A1 | 4/2005 | Riley |
| 2005/0105905 | A1 | 5/2005 | Ovadia |
| 2005/0114854 | A1 | 5/2005 | Padisetty |
| 2005/0256909 | A1 | 11/2005 | Aboulhosn |
| 2006/0074876 | A1 | 4/2006 | Kakivaya |
| 2006/0117025 | A1 | 6/2006 | Kaler |
| 2006/0117026 | A1 | 6/2006 | Kaler |
| 2006/0167841 | A1 | 7/2006 | Allan |
| 2007/0133520 | A1 | 6/2007 | Kakivaya |
| 2008/0069124 | A1 | 3/2008 | Patrick |
| 2009/0268677 | A1 | 10/2009 | Chou |
| 2009/0327312 | A1 | 12/2009 | Kakivaya |
| 2010/0005071 | A1 | 1/2010 | Kakivaya |
| 2010/0262717 | A1 | 10/2010 | Critchley |

FOREIGN PATENT DOCUMENTS

| | | |
|---|---|---|
| EP | 1643730 | 5/2006 |
| JP | 2001005758 | 1/2001 |
| JP | 2003316636 | 11/2003 |
| JP | 2004110624 | 4/2004 |
| JP | 2005092784 | 4/2005 |
| JP | 2005142959 | 6/2005 |
| JP | 2005148956 | 6/2005 |
| JP | 2005223722 | 8/2005 |
| JP | 2005252755 | 9/2005 |
| WO | WO02056182 A2 | 7/2002 |
| WO | WO03058537 | 7/2003 |
| WO | WO2004039031 A3 | 5/2004 |
| WO | WO 2005046173 | 5/2005 |

OTHER PUBLICATIONS

U.S. Appl. No. 13/599,681, filed Aug. 30, 2012, Kakivaya.

Mobility Protocol Framework to Support Multiple Namespaces by Masahiro Ishiyama and Mitsunobu Kunishi; Jan. 2003 Symposium on Applications and the Internet Workshops (SAINT 2003), Orlando, FL, pp. 208-213.

Storage, Mutability and Naming in Pasta by Tim D. Moretown, Ian A. Pratt and Timothy L. Harris; University of Cambridge Computer Laboratory; Cambridge, UK; May 2002; p. 215.

Explicit Namespaces by Franz Achermann and Oscar Nierstrasz; Software Composition Group, Univeristy of Berne; Theoretical Computer Science archive, vol. 331 , Issue 2-3 (Feb. 2005); pp. 367-396.

Cisco Systems; Configuring ATM Routing and PNNI: Dynamic Versus Static ATM Routing http://www.cisco.com/en/US/products/hw/switches/ps1893/products/confiquration_guide_chapter09186a00800f6565.html, Dec. 12, 2005.

Dynamic Reconfiguration of Network Applications and Middleware Systems in the Bio-Networking Architecture; Abstract; http://www.cs.umb.edu/~jxs/pub/lartes02.pdf, Dec. 2002 IEEE Workshop on Large Scale Real-Time and Embedded Systems.

Network Sensitive Reconfiguration of Distributed Applications, Abstract; http://www.cs.rpi.edu/research/pdf/05-03.pdf. May 1, 2003.

Performance-Responsive Middleware; Multi-domain Management; http://www.dcs.warwick.ac.uk/research/hpsg/middleware/middleware.html, Dec. 12, 2005.

Network Technologies; Approach;http://oxygen.lcs.mit.edu/Network.html, revised Jun. 2, 2004.

Sun Microsystems, Inc.: An Open-Source Peer-to-Peer Distributed Computing Project using JXTA, by Jerome Verbeke and Neelakanth Nadgir [retrieved online]. Retrieved from the Internet URL: http://www.jxta.org/JavaOne/JavaOne2003/jngi.pdf, Feb. 15, 2006.

Reliable and Secure Group Communication by Deb Agarwal [retrieved online]. Retrieved from the Internet URL: http://www.doecollaboratory.org/research2/groupcomm/rsgc_scidac_exec_summary-final.pdf, Sep. 2001.

Department of Computer Science, University of Maryland, College Park: Scalable Peer finding on the Internet, by Suman Banerjee, Christopher Kommareddy, and Bobby Bhattacharjee Jun. 2002. Retrieved from the Internet URL: http://pages.cs.wisc.edu/~suman/pubs/gi02.pdf.

Collaboration Technologies Group, Distributed Systems Department, Computational Research Division, Lawrence Berkeley National Laboratory: A Scalable and Secure Peer-to-Peer Information Sharing Tool [online][retrieved on Feb. 15, 2006].Retrieved from the Internet URL: http://dsd.lbl.gov/P2P/file-share/ Sep. 26, 2005.

(56) References Cited

OTHER PUBLICATIONS

Scalable Application-Level Anycast for Highly Dynamic Groups by Miguel Castro, Peter Druschel, Anne-Marie Kermarrec, and Antony Rowstron [retrieved online]. Retrieved from the Internet URL:http://project-iris.net/irisbib/papers/druschelanycast/paper.pdf Feb. 15, 2006.
Oriol, Manuel et al, "Hot-Swapping Communication Models in P2P Networks," hiccs, vol. 9, p. 1-10, Jan. 5-8, 2004.
Pierson, Nick, Microsoft Windows Server 2003 R2, "Overview of Active Directory Federation Services in Windows Server 2003 R2", Oct. 2005, 20 pages.
Ahlgren, Bengt, et al., "A Node Identity Internetworking Architecture", Mar. 29, 2006.
Cluster Resources, "Moab Adaptive Computing Suite", 2010, 4 pages [Retrieved from the Internet Mar. 19, 2010].
Narendula, Rammohan, et al., "Towards Access Control Aware P2P Data Management Systems", ACM Internation Conference Proceeding Series; vol. 360, Proceedings of the 2009 EDBT/ICDT Workshops, Mar. 2009, 8 pages.
U.S. Appl. No. 10/956,472, filed Aug. 9, 2007, Office Action.
U.S. Appl. No. 10/956,472, filed Mar. 18, 2008, Office Action.
U.S. Appl. No. 10/956,472, filed Jul. 29, 2008, Office Action.
U.S. Appl. No. 10/956,472, filed Dec. 19, 2008, Office Action.
U.S. Appl. No. 10/956,472, filed Jul. 9, 2009, Notice of Allowance.
U.S. Appl. No. 11/307,745, filed Sep. 3, 2008, Office Action.
U.S. Appl. No. 11/307,745, filed Feb. 11, 2009, Office Action.
U.S. Appl. No. 11/307,745, filed Jun. 22, 2009, Office Action.
U.S. Appl. No. 11/307,745, filed Oct. 22, 2009, Office Action.
U.S. Appl. No. 11/325,693, filed Feb. 4, 2009, Office Action.
U.S. Appl. No. 11/325,693, filed Aug. 10, 2009, Office Action.
U.S. Appl. No. 11/325,690, filed Jan. 3, 2008, Office Action.
U.S. Appl. No. 11/325,690, filed Jun. 2, 2008, Office Action.
U.S. Appl. No. 11/325,690, filed Oct. 22, 2008, Notice of Allowance.
U.S. Appl. No. 11/325,691, filed Mar. 3, 2009, Office Action.
U.S. Appl. No. 11/325,691, filed Sep. 28, 2009, Notice of Allowance.
U.S. Appl. No. 11/325,693, filed Dec. 23, 2009, Office Action.
U.S. Appl. No. 11/301,745, filed Mar. 24, 2010, Office Action.
U.S. Appl. No. 11/325,693, filed Aug. 16, 2010, Office Action.
U.S. Appl. No. 11/301,745, filed Sep. 7, 2010, Office Action.
U.S. Appl. No. 11/325,693, filed Feb. 1, 2011, Office Action.
U.S. Appl. No. 11/301,745, filed Feb. 14, 2011, Office Action.
U.S. Appl. No. 12/556,429, filed Mar. 3, 2011, Office Action.
U.S. Appl. No. 12/556,399, filed Apr. 1, 2011, Office Action.
U.S. Appl. No. 11/301,745, filed Jun. 27, 2011, Office Action.
U.S. Appl. No. 12/556,429, filed Oct. 6, 2011, Office Action.
U.S. Appl. No. 12/556,399, filed Oct. 11, 2011, Office Action.
U.S. Appl. No. 12/556,429, filed Jun. 2, 2012, Notice of Allowance.
U.S. Appl. No. 11/325,693, filed Apr. 26, 2012, Notice of Allowance.
U.S. Appl. No. 12/556,399, filed Jul. 12, 2012, Notice of Allowance.
U.S. Appl. No. 12/821,002, filed Aug. 10, 2012, Office Action.
Office Action dated Jan. 23, 2013 cited in U.S. Appl. No. 12/821,002.
Notice of Allowance dated May 16, 2013 cited in U.S. Appl. No. 12/821,002.
Office Action dated May 30, 2014 cited in U.S. Appl. No. 13/599,681.

* cited by examiner

ORGANIZING RESOURCES INTO COLLECTIONS TO FACILITATE MORE EFFICIENT AND RELIABLE RESOURCE ACCESS

CROSS-REFERENCE TO RELATED APPLICATIONS

This application is a continuation of U.S. patent application Ser. No. 12/556,399, filed on Sep. 9, 2009, entitled "ORGANIZING RESOURCES INTO COLLECTIONS TO FACILITATE MORE EFFICIENT AND RELIABLE RESOURCE ACCESS," which issued as U.S. Pat. No. 8,307,028 on Nov. 6, 2012, and which is a continuation of U.S. patent application Ser. No. 10/956,472, filed Sep. 30, 2004, entitled "ORGANIZING RESOURCES INTO COLLECTIONS TO FACILITATE MORE EFFICIENT AND RELIABLE RESOURCE ACCESS", and which issued as U.S. Pat. No. 7,613,703 on Nov. 3, 2009. The entirety of each of the foregoing applications is expressly incorporated herein by reference.

BACKGROUND OF THE INVENTION

1. The Field of the Invention

The present invention relates to organizing resources and, more particularly, to organizing resources into collections to facilitate more efficient and reliable resource access.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include electronic communication between a number of computer systems and/or other electronic devices via wired and/or wireless computer networks.

Due to the quantity and diversity of resources (e.g., devices and services) that are accessible via computer networks, a variety of different access mechanisms have been developed. Many access mechanisms utilize different protocols. For example, accessing Web pages on the World Wide Web ("WWW") is typically facilitated using the HyperText Transfer Protocol ("HTTP"). On the other hand, accessing a file from a remote location can be facilitated using the File Transfer Protocol ("FTP"). At times, the same content can be transferred using different protocols at different times. For example, an electronic mail message can be transferred between mail servers using Simple Mail Transfer Protocol and then transferred to a client using the Internet Message Access Protocol ("IMAP") or Post Office Protocol ("POP").

However, before a protocol can be used to transfer or access a resource, a corresponding access mechanism must have some way to identify the resource that is to be accessed or transferred. For example, before a Web browser can use HTTP to access a Web page, the Web browser must have some way to identify the Web page that is to be accessed. Similarly, before a mail client can use IMAP or POP to receive an electronic mail message, the mail client must have some way to identify the mail server that is storing the electronic message. Accordingly, virtually all resource access mechanisms also include an identification mechanism that can be used to identify resources.

One identification mechanism includes utilizing a network address (e.g., an Internet Protocol ("IP") address) to identify a corresponding computing device (e.g., a laptop, mail server, printer, PDA, etc.). Identifying computing devices by network address may be sufficient on smaller networks (e.g., Home Area Networks ("HANs")) and/or on networks where network addresses change relatively infrequently. However, on distributed larger scale networks, using network addresses as an identification mechanism is often problematic. For example, due to the vast quantity of computing devices on the Internet, it may be difficult, if not impossible, for a user to remember IP addresses for every computing device the user may desire to access. Further, there is always some possibility that a provider will change the network address of a computing device or transfer ownership of the computing device to a different provider that controls different network addresses. Thus, subsequent attempts to access a computing device at a previously known network address can fail and there may be no way to easily determine a more recent network address.

Accordingly, other identification mechanisms represent network addresses as alphabetic strings that are typically easier to remember and provide some level of abstraction from network addresses. For example, Domain Name Services ("DNS") can be used to represent IP addresses as alphabetic strings (e.g., corresponding to domain names). When an alphabetic string is used to identify a computing device, DNS checks a translation database to translate the alphabetic string to the corresponding IP address for the computing device. Further, when a new IP address is assigned to a computing device, the translation database can be updated such that a previously utilized alphabetic string identifying the computing device corresponds to the new IP address. Thus, DNS provides a level of abstraction that allows an IP address for a computing device to change without having to change the alphabetic string representing the computing device. Accordingly, if a provider changes an IP address for a computing device, the same alphabetic string can often be used to access the computing device.

However, since a computer system can be configured to simultaneous provide a number of different services, using DNS alone may not be sufficient to identify specific resources of a computing device. For example in some environments, using DNS as the sole identification mechanism, can make it difficult to differentiate between different services (e-mail, search functionality, etc.) offered by the same Web server. That is, identifying the Web server (e.g., by network address or alphabetic string) does not necessarily provide any indication of a specific service offered by the Web server. Thus, to access an electronic mail service of the Web server, an identification mechanism would need some way to differentiate the electronic mail service from other services of the Web server.

Uniform Resource Identifiers ("URIs") are one mechanism that has been developed to more precisely identify resources. A URI can include a network address or alphabetic string identifying a computing device as well as an addition alphanumeric string identifying a specific resource at the computing device. Uniform Resource Locators ("URLs") refer to a subset of URIs that identify resources via representation of their primary access mechanics (e.g., their network location). Universal Resource Names ("URNs") refer to a subset of URIs that are required to remain globally unique and persist even when a corresponding resource ceases to exist.

URLs are typically used for accessing resources on the Internet. For example, the URL "http://[domain name]/[alpha-numeric string]" can be used to identify a specific resource at a computing device on the WWW. URLs are also typically sub-divided into different schemes that represent different (often hierarchical) namespaces. For example, some of the different schemes used on the Internet include ftp, http, gopher, mailto, news, and telnet. Each of these schemes represents a different corresponding namespace respectively. This is beneficial as identification of resources can be scoped across the different namespaces and each scheme can have different syntax for identifying resources within its corresponding namespace. For example, the syntax for identifying resources in the http namespace and the syntax for identifying resources in the ftp namespace can differ.

Unfortunately, due at least in part to different schemes having different syntax, it is often difficult, if not impossible, to configure access to a resource such that the resource can be accessed from within multiple namespaces. That is, making a resource accessible from one namespace typically precludes the resource from being accessible from other namespaces. For example, the http scheme typically cannot be used to identify resources that have been configured for identification using the ftp scheme (and transfer using ftp). That is, a URL of the form http://[domain name]/[alpha-numeric string] typically cannot be used to identify a resource in the ftp namespace.

Further, typical resource identification mechanisms have limited querying capabilities. For example, one subset of URI share a common syntax for representing hierarchical relationships with a specified namespace. URIs of this subset can have the form <scheme>://<authority><path>?<query>, where the query portion is a string of information to be interpreted by the resource at <scheme>://<authority><path>. This facilitates the issuing of queries to a resource, such as, for example, to execute a search or discover resource capabilities.

However, typical resource identification mechanisms have limited, if any, functionality for utilizing a URI to query a namespace for resources contained in the namespace. URI syntax for some namespaces allow query functionality, but only at the lowest level within a namespace hierarchy (e.g., at leaf nodes). This results, at least in part, from the fact that existing namespace mechanisms do not view intermediate nodes as resources. Thus, a URI can be formulated to query for text files at a particular endpoint, such as, for example, URI representing a Web site for a specified corporation. However, it would be difficult, if not impossible, to formulate a URI to query the same namespace hierarchy for text files only from every domain ending in ".com".

Further, existing searching mechanisms require that large quantities of resource information be cached. For example, most Internet search engines constantly scan the Internet for new URLs and cache the URLs locally. When a search (or query) is submitted to the search engine, the search engine searches the cached URLs. Thus, if a URL for a resource is not cached or the URL changes after caching, the URL or correct URL for a resource may not be returned in search results. Therefore systems, methods, computer program products that facilitate more efficient and reliable resource access would be advantageous.

BRIEF SUMMARY OF THE INVENTION

The foregoing problems with the prior state of the art are overcome by the principles of the present invention, which are directed towards methods, systems, and computer program products for organizing resources into collections to facilitate more efficient and reliable resource access. In some embodiments, a namespace registration request is transferred in a namespace federation infrastructure. A namespace registration request to register a namespace branch is received, the namespace registration request including a namespace string that identifies the namespace branch. An at least one-way equivalent numeric identification value, for example, a hash value, is generated based on the entire namespace string for flat URI schemes or the portion up to the first path segment of the namespace string for hierarchical URL schemas. The namespace registration request is sent (and potentially routed) to a namespace manager having an identifier that is numerically closer to the at least one-way equivalent numeric identification value than the identifiers of other namespace managers. The namespace branch is associated with the namespace manager.

In other embodiments, a namespace registration request is migrated in a namespace federation infrastructure. It is determined that a namespace manager has satisfied a policy constraint. A namespace branch that can be migrated to meet a policy action associated with the policy constraint is identified. Existing registrations for the namespace branch are migrated to a partner namespace manager in response to the policy action.

In yet other embodiments, a namespace registration request is processed in a namespace federation infrastructure. A namespace registration request to register a namespace branch is received. The namespace registration request includes a namespace string that identifies the namespace branch and an identifier for the provider requesting registration in the namespace branch. It is determined that a namespace manager is interested in the namespace branch. The namespace string is saved in an appropriately indexed namespace registration database. It is further determined how often the liveliness of the registration request originator (e.g. a namespace provider) is to be subsequently verified.

In further embodiments, a namespace lookup request is sent (and potentially routed) in a namespace federation infrastructure. A namespace lookup request including a namespace string that identifies a namespace branch is received. An at least one-way equivalent numeric identification value, for example, a hash value, is generated based on the entire namespace string for flat URI schemes or the portion up to the first path segment of the namespace string for hierarchical URI schemes. The namespace lookup request is sent (and potentially routed) to a destination namespace manager, for example, in accordance with a proximity metric. The destination namespace manager can be any one of the neighborhood of namespace managers that are within a predefined range of a namespace manager having a unique identifier numerically closest to the at least one-way equivalent numeric identification value. The namespace lookup request is forwarded for delivery to originators of corresponding registration requests (e.g. namespace providers) that have expressed interest in or are responsible for the namespace branch.

In yet further embodiments, a namespace lookup request is migrated in a federation namespace infrastructure. A namespace manager receives a namespace lookup request for a namespace branch. The namespace manager includes a unique namespace identifier that identifies the namespace branch. A namespace manager unique identifier for the namespace manager being closer to the generated namespace branch unique identifier (e.g., an at least one-way equivalent numeric identification value) than namespace manager unique identifiers of one or more other namespace managers.

An indication that the namespace branch has been migrated to a different namespace manager having a different namespace manager unique identifier is detected.

In further other embodiments, a namespace lookup request is processed in a federation namespace infrastructure. A namespace lookup request, including a namespace string that identifies a namespace branch of a namespace, is received. The namespace lookup request type of the namespace lookup request is identified. It is detected that one or more providers have registered for portions of the namespace related to the namespace branch. The namespace lookup request is forwarded to at least one provider based on the identified namespace lookup request type.

In additional embodiments, a resource participates in multiple namespaces in a federation namespace infrastructure. A unique resource identifier for a resource is established. The availability of the resource is published in a first namespace. The unique resource identifier is linked to an existing namespace node resource in the first namespace such that the first namespace can be traversed to identify the resource. The availability of the resource is published in a second namespace. The unique resource identifier is linked to an existing namespace node resource in the second namespace such that the second namespace can be traversed to identify the resource.

In even further additional embodiments, a subset of resources in namespace federation infrastructure is identified. A query is received from an originator. The query includes a first query portion identifying a first portion of resources that satisfies first query criteria at a first level in a namespace hierarchy. The query includes a second query portion identifying a second portion of resources selected from among the resources included in the first portion of resources. The second portion of resources is identified at a second different location in the namespace federation infrastructure. The identity of the second portion of resources is returned to the originator.

In further additional embodiments, a plurality of resources is organized. It is determined that a resource is to be included in one or more namespaces wherein each of the one or more namespaces is configured to organize one or more resources. A first resource within a first namespace of the one or more namespaces and that is to be related to the resource is identified. A first namespace segment is used to link the resource to the first resource such that the namespace segment can be traversed to navigate from the first resource to the resource within the namespace.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
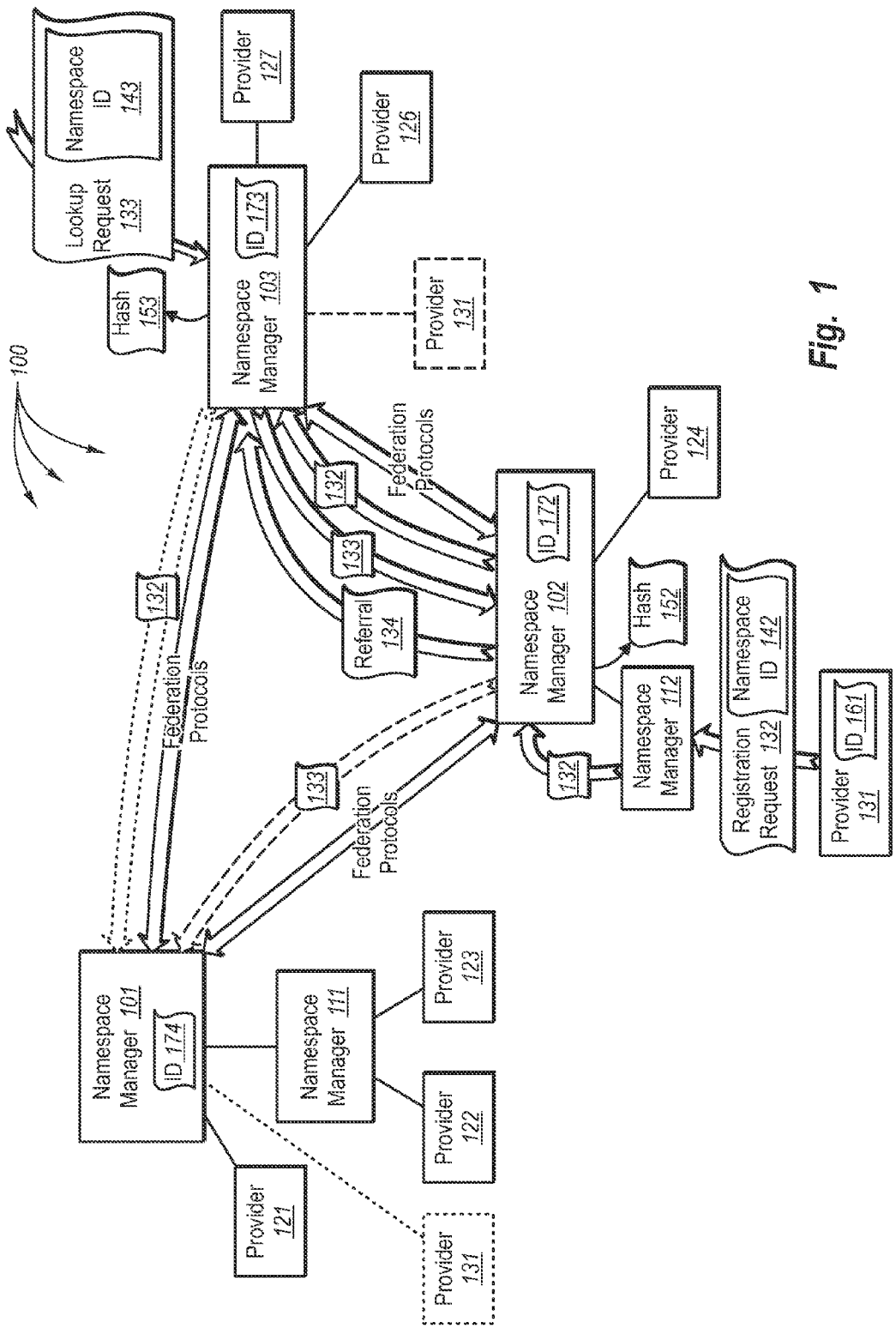
FIG. 1 illustrates an example of a namespace federation infrastructure.

The principles of the present invention provide for organizing resources into collections to facilitate more efficient and reliable resource access. In some embodiments, a namespace registration request is transferred in a namespace federation infrastructure. A namespace registration request to register a namespace branch is received, the namespace registration request including a namespace string that identifies the namespace branch. An at least one-way equivalent numeric identification value, for example, a hash value, is generated based on the entire namespace string for flat URI schemes or the portion up to the first path segment of the namespace string for hierarchical URL schemas. The namespace registration request is sent (and potentially routed) to a namespace manager having an identifier that is numerically closer to the at least one-way equivalent numeric identification value than the identifiers of other namespace managers. The namespace branch is associated with the namespace manager.

In other embodiments, a namespace registration request is migrated in a namespace federation infrastructure. It is determined that a namespace manager has satisfied a policy constraint. A namespace branch that can be migrated to meet a policy action associated with the policy constraint is identified. Existing registrations for the namespace branch are migrated to a partner namespace manager in response to the policy action.

In yet other embodiments, a namespace registration request is processed in a namespace federation infrastructure.

A namespace registration request to register a namespace branch is received. The namespace registration request includes a namespace string that identifies the namespace branch and an identifier for the provider requesting registration in the namespace branch. It is determined that a namespace manager is interested in the namespace branch. The namespace string is saved in an appropriately indexed namespace registration database. It is further determined how often the liveliness of the registration request originator (e.g. a namespace provider) is to be subsequently verified.

In further embodiments, a namespace lookup request is sent (and potentially routed) in a namespace federation infrastructure. A namespace lookup request including a namespace string that identifies a namespace branch is received. An at least one-way equivalent numeric identification value, for example, a hash value, is generated based on the entire namespace string for flat URI schemes or the portion up to the first path segment of the namespace string for hierarchical URI schemes. The namespace lookup request is sent (and potentially routed) to a destination namespace manager, for example, in accordance with a proximity metric. The destination namespace manager can be any one of the neighborhood of namespace managers that are within a predefined range of a namespace manager having a unique identifier numerically closest to the at least one-way equivalent numeric identification value. The namespace lookup request is forwarded for delivery to originators of corresponding registration requests (e.g. namespace providers) that have expressed interest in or are responsible for the namespace branch.

In yet further embodiments, a namespace lookup request is migrated in a federation namespace infrastructure. A namespace manager receives a namespace lookup request for a namespace branch. The namespace manager includes a unique namespace identifier that identifies the namespace branch. A namespace manager unique identifier for the namespace manager being closer to the generated namespace branch unique identifier (e.g., an at least one-way equivalent numeric identification value) than namespace manager unique identifiers of one or more other namespace managers. An indication that the namespace branch has been migrated to a different namespace manager having a different e namespace manger unique identifier is detected.

In further other embodiments, a namespace lookup request is processed in a federation namespace infrastructure. A namespace lookup request, including a namespace string that identifies a namespace branch of a namespace, is received. The namespace lookup request type of the namespace lookup request is identified. It is detected that one or more providers have registered for portions of the namespace related to the namespace branch. The namespace lookup request is forwarded to at least one provider based on the identified namespace lookup request type.

In additional embodiments, a resource participates in multiple namespaces in a federation namespace infrastructure. A unique resource identifier for a resource is established. The availability of the resource is published in a first namespace. The unique resource identifier is linked to an existing namespace node resource in the first namespace such that the first namespace can be traversed to identify the resource. The availability of the resource is published in a second namespace. The unique resource identifier is linked to an existing namespace node resource in the second namespace such that the second namespace can be traversed to identify the resource.

In even further additional embodiments, a subset of resources in namespace federation infrastructure is identified.

A query is received from an originator. The query includes a first query portion identifying a first portion of resources that satisfies first query criteria at a first level in a namespace hierarchy. The query includes a second query portion identifying a second portion of resources selected from among the resources included in the first portion of resources. The second portion of resources is identified at a second different location in the namespace federation infrastructure. The identity of the second portion of resources is returned to the originator.

In further additional embodiments, a plurality of resources is organized. It is determined that a resource is to be included in one or more namespaces wherein each of the one or more namespaces is configured to organize one or more resources. A first resource within a first namespace of the one or more namespaces and that is to be related to the resource is identified. A first namespace segment is used to link the resource to the first resource such that the namespace segment can be traversed to navigate from the first resource to the resource within the namespace.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links (of possibly different speeds) that enable the transport of electronic data between computer systems and/or modules (e.g., hardware and/or software modules). When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code. In some embodiments, hardware modules, such as, for example, special purpose integrated circuits or Gate-arrays are optimized to implement the principles of the present invention.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system can include one or more computers coupled via a network. Likewise, a computer system can include a single physical device (such as a mobile phone or Personal Digital Assistant "PDA") where internal modules (such as a memory and processor) work together to perform operations on electronic data. Further, a computer system can include special purpose hardware, such as, for example, a router that includes special purpose integrated circuits.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, routers, gateways, brokers, proxies, firewalls, redirectors, network address translators and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and in the following claims, a "resource" is defined as any module, component, object, computer system, device, file, database item, schema, service, etc., that can be utilized to satisfy a specified function, such as, for example, to store data, to define a data format, to print a document, etc. Resources can be backed and/or hosted by service components. For example, a file resource can have a file server as the service component for accessing the file. Similarly, a conference room can have a receptionist's mailbox as the service component for scheduling a meeting. The resource implemented may be distributed across a plurality of other resources.

Resource is also defined to include namespace node resources, for example, included in a namespace, that facilitate or provide access to namespace functionality, such as, for example, namespace security and administrative functions, and/or that can be traversed to access other resources, such as, for example, another namespace node resource, a computer system, or computer system component. In some embodiments, namespace node resources can be implemented in a distributed fashion. Further, a namespace node resource can represent a corresponding node in a namespace tree.

In this description and in the following claims, a "resource descriptor" is defined as a data structure (e.g., formatted in accordance with a resource descriptor schema) describing a resource.

In this description and in the following claims, a "namespace" is defined as scoping mechanism for breaking up resources (e.g., all the resources on the Internet) into portions over which resolution, discovery, and message routing can be performed. Namespaces are extensible such that new scopes can be defined and individual scopes can be hierarchical.

Namespaces can be viewed as a forest where each namespace (tree) is represented as a Uniform Resource Identifier ("URI") with scheme and the part immediately following it serving as the root. The URI scheme can be hierarchical or flat. Hierarchical schemes such as "name" and "http" (as opposed to flat schemes such as "uuid") can be identified by the presence of the ":/" character sequence after the scheme name. The first part of hierarchical schemes can identify the naming authority responsible for the rest of the URI components. Such URIs are identified by the presence of the "://" character sequence after the scheme name. Namespaces can be both hierarchical and are routable meaning that namespaces serve as identifiers that can be used to identify the communication paths from the sender to receiver.

In some embodiments, a namespace can be defined as follows:

| | | |
|---|---|---|
| Namespace | := | Flat \| Hierarchical |
| Flat | := | Scheme ':' Opaque_part |
| Hierarchical | := | Scheme ":/" ('/' Authority '/')? Segment ('/' Segment)* |
| Scheme | := | as defined by RFC-2396 on URI Generic Syntax |
| Opaque_part | := | as defined by RFC-2396 on URI Generic Syntax |
| Authority | := | as defined by RFC-2396 on URI Generic Syntax |
| Segment | := | as defined by RFC-2396 on URI Generic Syntax |

Resources can be made available at any branch in the tree, and a given resource can be exposed in multiple namespaces. Also, a given namespace can identify a single resource or a namespace branch (a group of resources). Such a grouping can be logical or physical depending on the semantics of the Namespace. The group is obtained by performing a depth-first-search on the identified Namespace branch. Once a group of resources have been identified, many operations can be performed on them such as selecting resources that satisfy some criteria, sending (and potentially routing) a given message to only those in a group, and so on.

A single resource can be viewed as a trivial collection. Thus, every resource can be assigned a name (space). Because namespaces are routable, messages can be routed over a namespace federation infrastructure to any resource that has a name. Such routing can cross trust boundaries and traverse firewalls.

Generally, a resource can be assigned one or more URIs that can be used to access the resource. One URI, the Resource ID, assigned to a resource can be, at a minimum, unique across all namespaces implemented by a given namespace federation infrastructure such that the resource can be singularly referenced. Other, potentially non-unique, URIs can also be assigned to resources. These other, potentially non-unique, URIs provide access to the resource via additional locations within namespaces implemented by a given namespace federation infrastructure. A resource can be assigned at least one potentially non-unique URI for each namespace that can be traversed to access the resource.

Figure 5:
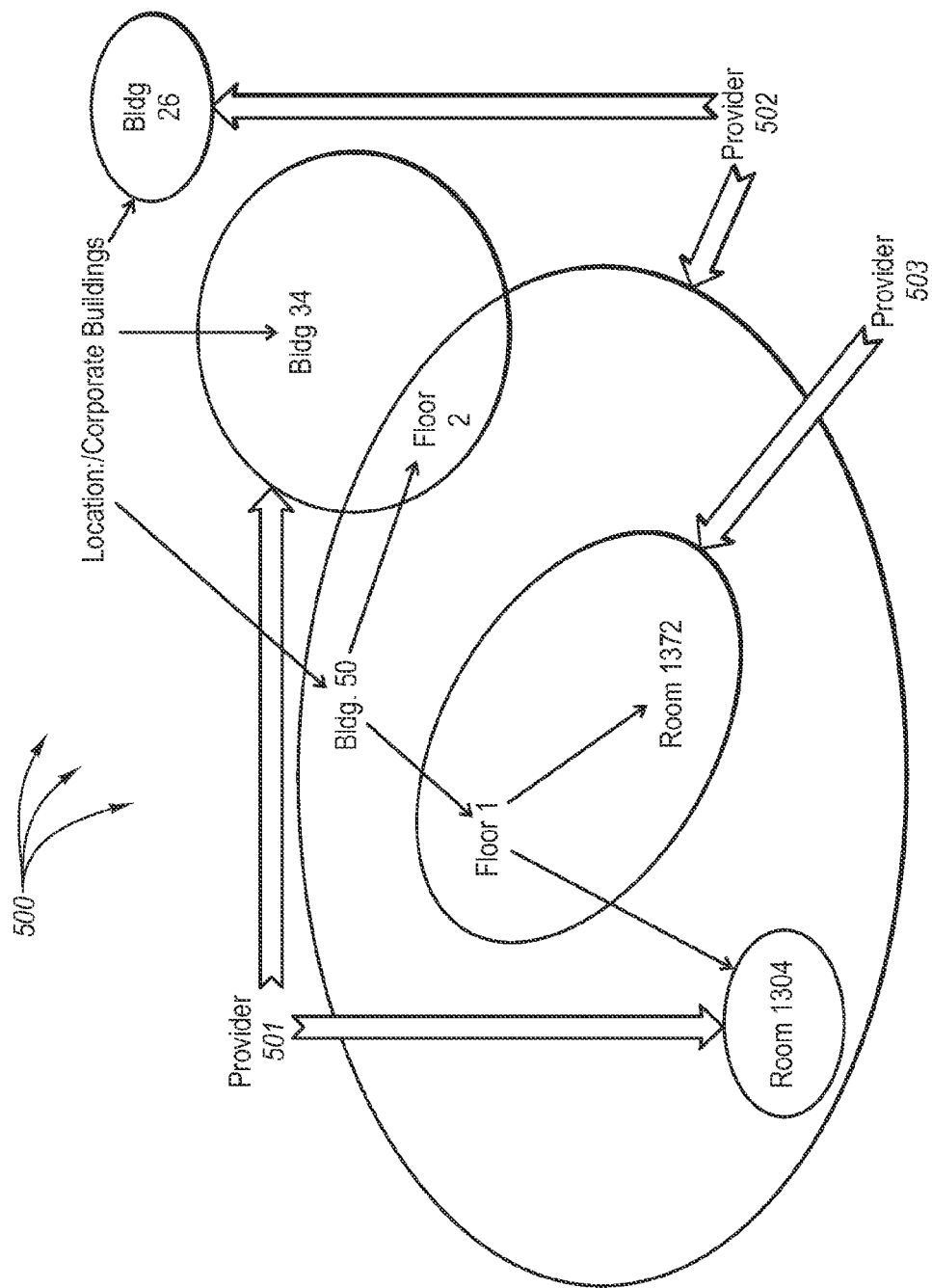
FIG. 5 illustrates an example of a namespace federation infrastructure from provider and collection views of a namespace.

FIG. 5 illustrates an example of a namespace federation infrastructure 500 from provider and collection views of a namespace. Namespace federation infrastructure 500 depicts that providers can be registered at any branch in a namespace tree. Further, a provider can be registered at multiple namespace branches, potentially in different trees. For example, provider 501 is registered for the namespace branches location:/CorporateBuildings/bldg34, location:/CorporateBuildings/bldg50/floor2, and location:/CorporateBuildings/bldg50/floor1/room1304. Provider 502 is registered for namespace branches location:/CorporateBuildings/bldg50 and location:/CorporateBuildings/bldg26. Provider 503 is registered for location:/CorporateBuildings/bldg50/floor1.

As depicted in FIG. 5, applications can view namespaces as a logical collection of resources that can nest hierarchically. That is, intermediate namespace nodes (e.g., location:/CorporateBuildings/bldg50/floor1 and location:/CorporateBuildings/bldg50) are viewed as resources—namespace node resources. Applications can efficiently operate on such logical collections in a coherent and scalable manner, including publishing, searching, locating, tracking, targeting, and sourcing events from inside the collections. Note that not all the resources inside a logical collection are necessarily located on a single computer system or device. Resources can be distributed both in space and time across many computer systems and device. The namespace federation infrastructure takes care of efficiently routing lookup requests to the computer systems and devices participating in any given collection, thereby providing a uniform and consistent view to applications.

Figure 6:
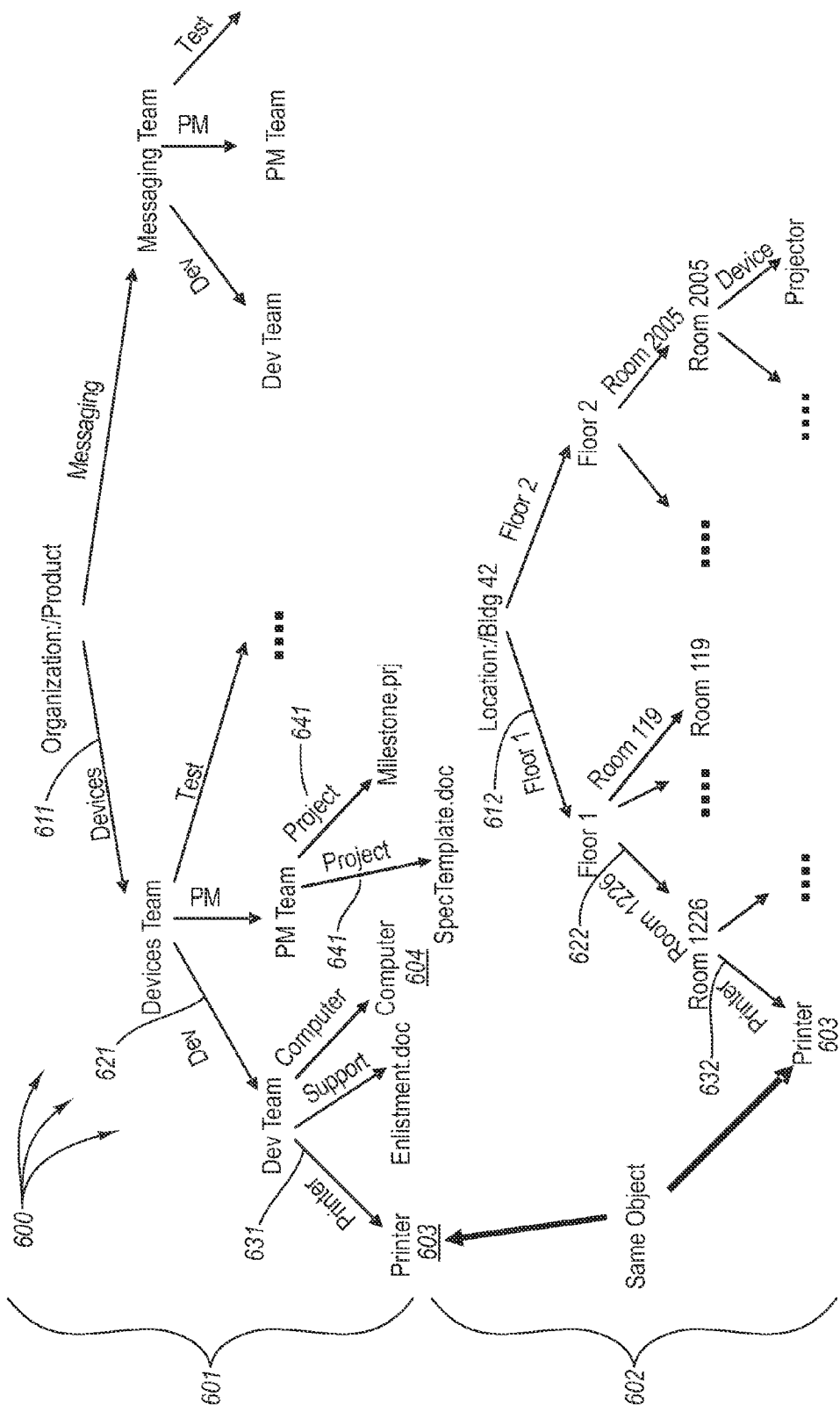
FIG. 6 illustrates an example namespace federation infrastructure with a resource made available in a plurality of namespaces.

FIG. 6 illustrates an example namespace federation infrastructure 600 with a resource made available in a plurality of namespaces. The URI Organization:/Product identifies the root of namespace tree 601. Similarly, URI Location:/Bldg 42 identifies the root of namespace tree 602. As depicted, printer 603 is exposed in both namespace tree 601 and namespace tree 602.

Within this specification and the following claims, a namespace node resource can be viewed simply as a node in a namespace tree. Some namespace node resources can be viewed as root nodes (e.g., Location:/Bldg42), others can be viewed as intermediate nodes (e.g., Organization:/Product/Devices Team, and others can be viewed as leaf nodes (e.g., Location:/Bldg 42/Floor 1/Room 112/Printer 603). However, it should be understood that a namespace node resource in one namespace tree can reference a namespace node resources (or other resources) in another namespace tree. Thus, viewing a namespace node resource as a root, intermediate, or leaf in one namespace tree does not limit the querying of that namespace node resource from other namespace trees.

A namespace also includes namespace segments that link (or relate) two or more namespace node resources. A namespace segment can be utilized to link namespace node resources in the same namespace. For example, the namespace segment 611 ("Devices") links Organization:/Product to Devices Team. Further, a namespace segment can link (otherwise connected) namespace node resources in different namespace trees thereby providing the functionality of symbolic links. Traversing a namespace segment includes navigation to all the target namespace node resources. For example, the namespace segment 641 ("Project") connects the PM Team to the file resources SpecTemplate.doc and Milestone.prj.

Accordingly, namespace segment 611 ("Devices"), namespace segment 621 ("Dev"), and namespace segment 631 ("Printer") can be traversed in namespace tree 601 to identify printer 603. Likewise, namespace segment 612 ("Floor 1"), namespace segment 622 ("Room 1226"), and namespace segment 632 ("Printer") can be traversed in namespace tree 602 to identify printer 603. It should be understand that the URI scheme of namespace tree 601 and the URI scheme of namespace tree 602 can differ.

Since the same resource can participate in multiple namespaces and with the presence of the symbolic link functionality, a global view of all the namespaces and the resources participating in them forms a directed graph with the Namespace segments serving as labeled graph edges and namespace node resources and other resources serving as graph nodes. The namespace roots effectively partition the namespace node resources and other resources in this global graph into a set of starting and reachable resources with the starting namespace node resources providing the basis for namespace scoping. Accordingly, cached information for implementing queries is reduced and distributed across each namespace.

Also, any given namespace can form a graph since the same resource can be made available at multiple Namespace branches and some segments can connect otherwise connected namespace node resources.

FIG. 1 illustrates an example of a namespace federation infrastructure 100. The namespace federation infrastructure 100 includes namespace managers 101, 102, 103, 111, and 112 that can form different types of federating partnerships. For example, namespace managers 101, 102, 103 are federated among one another as peers without a root namespace manager. On the other hand, namespace managers 111 and 112 federate with namespace managers 101 and 102 respectively with namespace managers 101 and 102 serving as root namespace managers. Different types of devices can participate in the namespace federation infrastructure, including hosts (e.g., PCs hosting resources), message routers, message gateways (e.g., firewalls, network address translation ("NAT" boxes, and redirectors), and message brokers (e.g., pub-sub intermediaries). Namespace federation infrastructure 100 facilitates bus protocols (e.g., liveness, control, eventing, and streaming). Further, namespace federation infrastructure 100 can interoperate with third-party software and hardware stacks using related WS protocols such as, for example, WS-Discovery and WS-Eventing.

Generally, the namespace managers 101, 102, 103, 111, and 112 can utilize namespace federation protocols to form partnerships and exchange namespace information. The formation of partnerships and exchange of namespace information facilitates more efficient and reliable access to namespace resources. It may be that peer namespace managers (e.g., namespace managers 101, 102 and 103) exchange namespace information with other peer namespace manages. However, other namespace managers (e.g., namespace managers 111 and 112) may exchange namespace information with corresponding root namespace managers (e.g., namespace managers 101 and 102). Each of the namespace managers 101, 102, 103, 111, and 112 can maintain a database of namespace information, such as, for example, what namespace managers or providers are interested in which namespace branches.

Namespace federation infrastructure 100 includes providers 121, 122, 123, 124, 126, and 127. Each of the providers can be interested in one or more namespace branches in the namespace federation infrastructure. Providers exchange namespace information with a corresponding namespace manager. For example, provider 122 exchanges namespace information with namespace manager 111. A corresponding namespace manager then facilitates transferring the namespace information to other namespace managers. For example, namespace manager 111 can transfer the namespace information to namespace manager 101 and namespace manager 101 can in turn transfer relevant portions of the namespace information to namespace managers 102 and 103.

A namespace federation infrastructure (e.g., namespace federation infrastructure 100) facilitates distributing lookup requests over namespaces to appropriate providers. For example, it may be that providers 501, 502, and 503 are each one of the providers 121, 122, 123, 124, 126, or 127.

Namespace managers can federate using a variety of different mechanisms. A first federating mechanism includes peer namespace managers forwarding namespace information to all other peer namespace managers. When a namespace manager is to join a namespace federation infrastructure, the namespace manager utilizes a broadcast/multicast discovery protocol, such as, for example, WS-Discovery to announce its presence (a broadcast/multicast Hello) and issues a broadcast/multi-cast Probe to detect other namespace managers. The namespace manager then establishes a simple forwarding partnership with other namespace managers already present on the network and accepts new partnerships with newly joining namespace managers. Thereafter, the namespace manager can forward every namespace request to its partners.

A second federating mechanism includes peer namespace managers efficiently forwarding all namespace information to other peer namespace managers. When a new namespace manager is to join a namespace federation infrastructure, the new namespace manager utilizes a broadcast/multicast discovery protocol, such as, for example, WS-Discovery to announce its presence (a broadcast/multicast Hello) and issues a broadcast/multicast Probe to detect other namespace managers that are part of the namespace federation infrastructure. Upon detecting another namespace manager, the new namespace manager establishes a partnership with the other namespace manager. From the established partnership, the new namespace manager learns about the presence of other namespace managers already participating in federation namespace infrastructure. It then establishes partnerships with these newly-learned namespace managers and accepts any new incoming partnership requests.

Both namespace manager arrivals/departures and namespace registrations are flooded through the namespace federation infrastructure resulting in every namespace manager having global knowledge of other namespace mangers and namespace registrations. With such global knowledge, any namespace manager can forward lookup requests to only partners that have providers/subscribers registered under the namespace branch specified in the request.

A third federating mechanism includes peer namespace managers indirectly forwarding namespace information to other peer namespace managers. In this third mechanism, namespace managers are assigned unique identifiers (ID's), such as, for example, a 128-bit or 160-bit ID. The namespace manager responsible for a given namespace tree is determined to be the one whose ID is closest to the one obtained by an at least one-way mapping function, such as, for example, hashing the given namespace tree. Such a hashing based mapping scheme for namespaces is described in further detail below.

In this third mechanism, namespace manager arrivals and departures are flooded over the fabric. On the other hand, namespace registrations are forwarded to the namespace manager determined to be responsible for the namespace branch specified in the request. For scalability, load balancing, and fault-tolerance, the namespace manager receiving namespace registrations may reliably flood these registrations among those namespace mangers that are within its neighborhood set. The neighborhood set for a specified namespace manager is determined to be the set of namespace managers having IDs within a predefined range on either side of the ID of specified namespace manager within a finite modulo ID-address-space.

Similar to mechanism 2, a newly-joining namespace manager utilizes a broadcast/multicast discovery protocol, such as, for example, WS-Discovery to announce its presence (a broadcast/multicast Hello) and issues a broadcast/multicast Probe to detect a namespace manager that is already part of the namespace federation infrastructure. The new namespace manager establishes a partnership with the discovered namespace manager and uses that partnership to learn about the presence of other namespace managers participating in the namespace federation infrastructure. The new namespace manager then establishes further partnerships with the newly discovered namespace managers and accepts any new incoming partnership requests. It accepts incoming namespace registrations from its partners under the namespace branches for which it is responsible and may flood them over its neighborhood set.

In response to incoming lookup requests, the new namespace manager consults its registration database and forwards the requests to the namespace managers having providers/subscribers registered under the namespace branch specified in the request. Thus, when using this third mechanism, every namespace manager in the namespace federation infrastructure has global knowledge of all other namespace managers but the registration information is efficiently partitioned among the namespace mangers. A namespace manager thus indirectly forwards the lookup request to only those partners that have providers/subscribers registered under the namespace branch specified in the request. This indirection is accomplished via the namespace manager that has global knowledge of the namespace registrations under the namespace branch specified in the request.

A fourth federating mechanism includes peer namespace managers indirectly routing namespace information to other peer namespace managers. This fourth mechanism differs from the third mechanism in the sense that both namespace manager arrivals/departures and namespace registration/lookup requests are all routed instead of being flooded. Routing protocols are designed to guarantee rendezvous between namespace lookup requests and namespaces registration requests.

Figure 2:
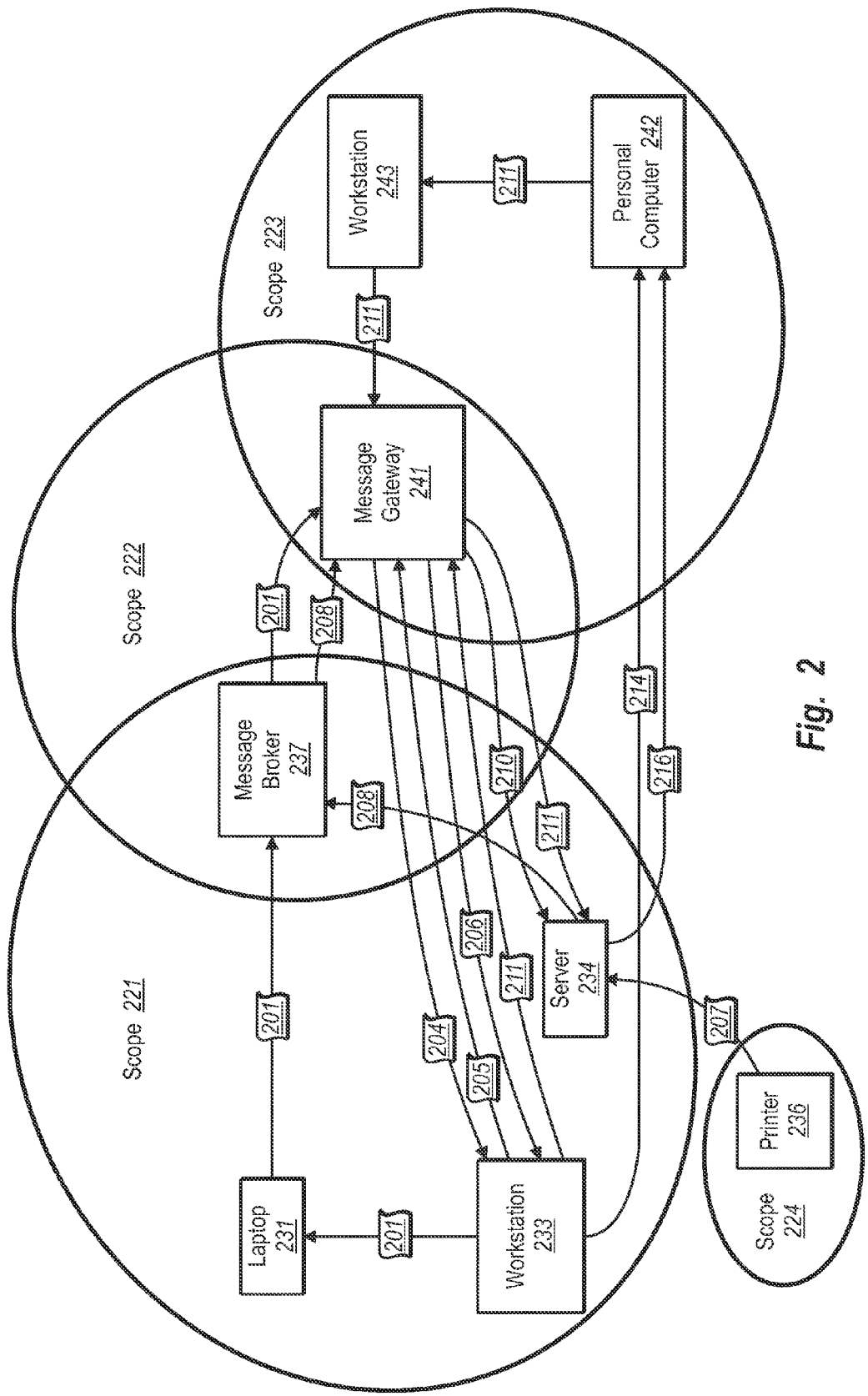
FIG. 2 illustrates an example of a computer architecture that facilitates routing request indirectly to partners.

FIG. 2 illustrates an example of a computer architecture 200 that facilitates routing requests indirectly to partners. Computer architecture 200 depicts different types of computer systems and devices potentially spread across multiple local discovery scopes participating in a namespace federation infrastructure.

Workstation 233 can include a PnP provider instance that registers with a corresponding namespace manager under the location:/architecture200/scope221/Devices namespace branch. To inform its partners of the presence of this PnP provider instance, workstation 233 routes namespace registration request 201 over the namespace federation infrastructure. Namespace registration request 201 is initially forwarded to laptop 231, which in turn forwards namespace registration request 201 to message broker 237, which in turn forwards namespace registration request 201 to message gateway 241. Message gateway 241 saves the registration information registration request 201 in its database and returns success message 204 to workstation 233.

Subsequently, another provider instance, this time that of running services, comes alive within the workstation 233 and registers itself with the corresponding namespace manager under the location:/architecture200/scope221/Services namespace branch. This time the namespace manager is aware that message gateway 241 is responsible for registrations under location:/architecture200 and forwards registration request 205 to message gateway 241 directly. Message gateway 241 saves the registration information registration request 205 in its database and returns success message 206 to workstation 233.

Subsequently, the printer 236 (e.g., a UPnP printer) is powered on and sends announcement 207. Server 234 detects announcement 207, assigns the namespace location:/architecture200/scope224/Devices to printer 236, and routes registration request 208 to message broker 237. Message broker 237 forwards registration request 208 to message gateway 241. Message gateway 241 saves the registration information registration request 208 in its database and returns success message 210 to server 234.

Subsequently, personal computer 242 issues find request 211 to discover all devices under the Namespace branch location:/architecture200. Since personal computer 242 doesn't know where to forward find request 211, it routes find request 211 through workstation 243. As the routing protocol essentially guarantees rendezvous between registration and lookup requests for a given Namespace tree, workstation 243 forwards find request 211 to message gateway 241. Message gateway 241 forwards find request 211 to both the workstation 233 and server 234. Workstation 233 and server 234 send response messages 214 and 216 respectively to personal computer 242.

This fourth mechanism works by routing a request to the namespace manager (message gateway 241) that has global knowledge of the namespace registrations under the namespace branch (e.g., location:/architecture200) specified in a request. This fourth mechanism essentially guarantees that routing can be accomplished in O(log N) hops, where N is the number of namespace managers participating in the federation namespace infrastructure. Since this fourth mechanism efficiently partitions namespace registration information and does not mandate global knowledge of all the participating namespace managers, it scales to very large networks, even the Internet.

Figure 3:
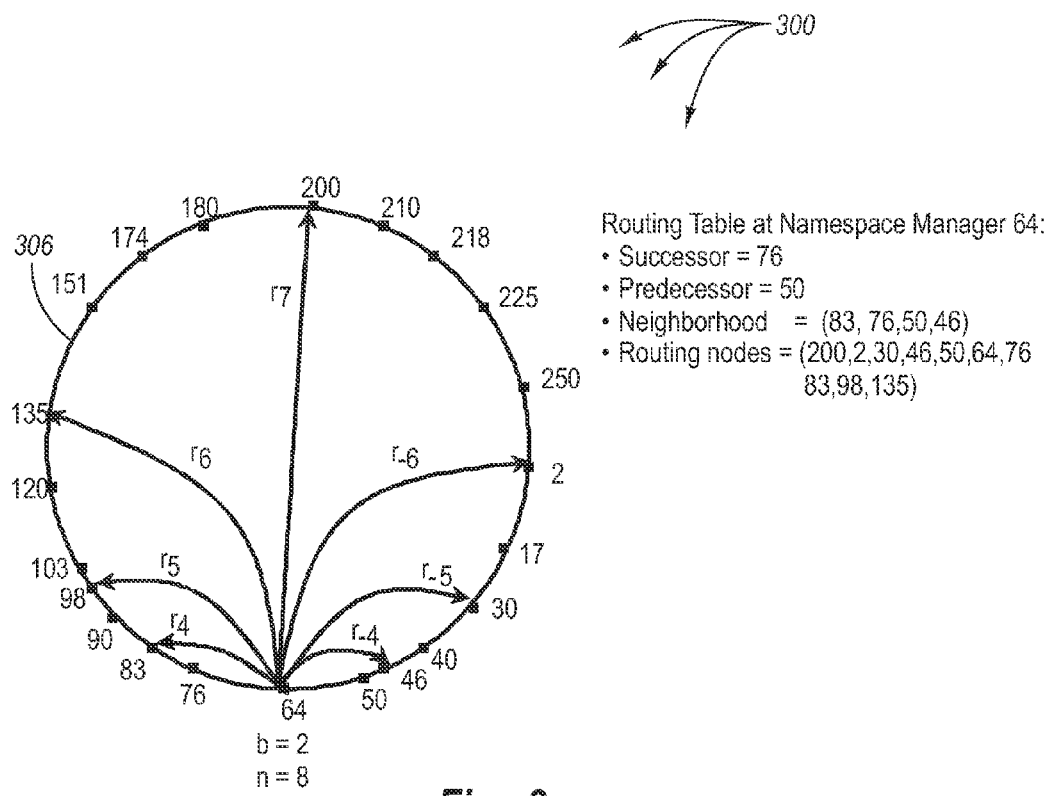
FIG. 3 illustrates an example of a binary relation between namespace managers in a namespace federation infrastructure.

FIG. 3 illustrates an example of a binary relation between namespace manages in a namespace federation infrastructure. The binary relation depicted in FIG. 3 is one relation that may be utilized to implement more efficient routing between namespace managers. Namespace managers participating in a namespace federation infrastructure are organized as a sorted list using a binary relation that is reflexive, anti-symmetric, transitive, total, and defined over the domain of namespace manager identities. Both ends of the sorted list are joined, thereby forming ring 306. This makes it possible for each namespace manager in the sorted list to view itself as being at the middle of the sorted list. The sorted list can be doubly linked so that any namespace manager can traverse the sorted list in either direction. Further, there is a 1:1 mapping from the value domain of the namespace manager identities (e.g., 2, 50, or 151) to the namespace managers themselves. This mapping accounts for the sparseness of the namespace managers in the value domain when the mapping is not tight.

Each namespace manager on ring 306 can include a routing table that facilitates routing namespace information (e.g., registration and lookup requests) to other namespace managers. An example routing table for the namespace manager having ID 64 is depicted in FIG. 3. The routing table indicates that the successor to ID 64 is ID 76. The successor can be in the immediate adjacent namespace manager in a clockwise direction from ID 64 on ring 306. The successor can change, for example, when a new namespace manager (e.g., with an ID of 71) joins or an existing namespace manager (e.g., ID 76) leaves the namespace federation infrastructure.

The routing table indicates that the predecessor to ID 64 is ID 50. The predecessor can be the immediate adjacent namespace manager in a counterclockwise direction from ID 64 on ring 306. The predecessor can change, for example, when a new namespace manager (e.g., with an ID of 59) joins or an existing namespace manager (e.g., ID 50) leaves the namespace federation infrastructure.

The routing table indicates that the neighbors to ID 64 are IDs 83, 76, 50 and 46. Neighbors can be identified using the larger of the two factors size and range. A namespace manager is identified as a member of a neighborhood when a corresponding ID is within minimum range of the subject ID (e.g., in a clockwise or counterclockwise direction of ring 306) or there are less than some configured minimum neighborhood size present in the neighborhood already. For example, on ring 306, the specified range can have a magnitude of 20 and the size can be greater than 4. Accordingly, IDs within 20 locations of ID 64 in both the clockwise (+10) and counterclockwise direction (−10) are neighbors to ID 64. The neighbors can change, for example, when namespace managers join or leave the namespace federation infrastructure or when the specified range is changed. For example, with size equals 4 a new namespace manager with ID 48 can replace the namespace manager having ID 46.

The routing table indicates that ID 64 can route directly to IDs 200, 2, 30, 46, 50, 64, 76, 83, 98, and 135. Thus, when namespace manager having ID 64 receives a request, the namespace manager can route the requests to the namespace manager having an ID in the routing table that is closer to the namespace manager ID in the request.

Figure 4:
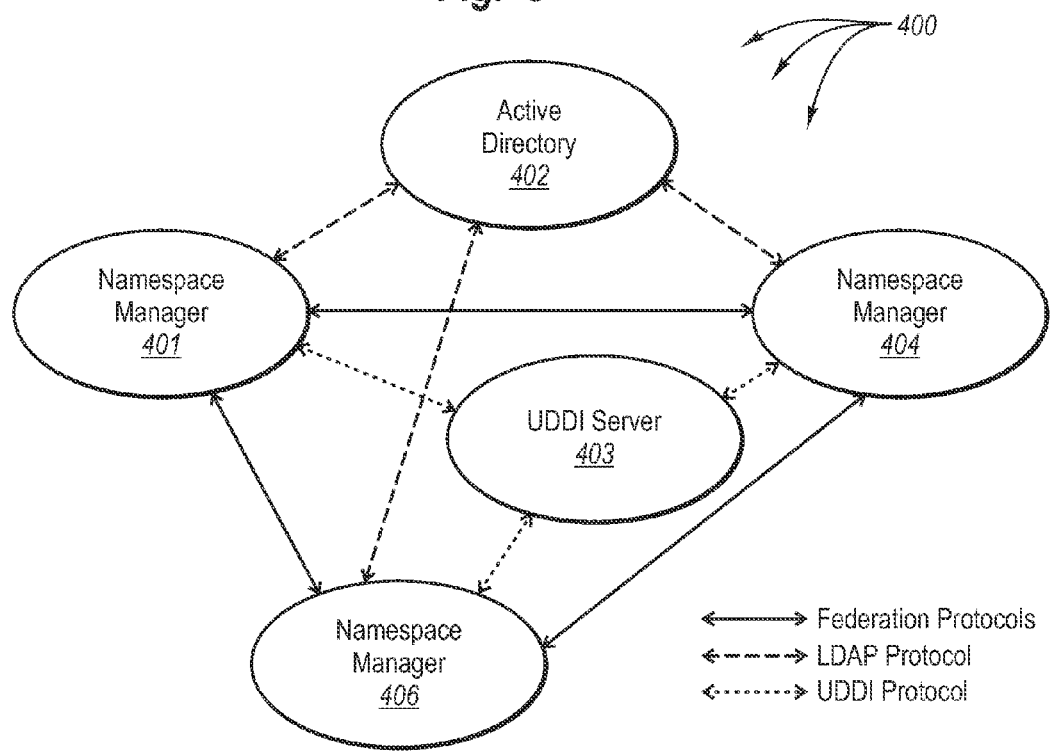
FIG. 4 illustrates an example of an architecture that facilitates integrating a namespace federation infrastructure with other protocols.

FIG. 4 illustrates an example of an architecture 400 that facilitates integrating namespace federation infrastructure with other protocols. A namespace federation infrastructure can support a provider-based extension model. Accordingly, a federation namespace infrastructure can be integrated with existing protocols provided the resource model of the existing protocol is compatible with that of namespaces. Architecture 400 depicts namespace managers 401, 404, 406 (e.g., of a namespace federation infrastructure) interoperating with active directory 402 and UDDI server 403. The solid arrows indicate that namespace managers communicate using namespace federation protocols, the dashed areas indicate that namespace manages communicate with active directory 402 using LDAP protocols, and the dotted arrows indicate that namespace managers communicate with UDDI server 403 using UDDI protocols.

Pub-sub topics is another example usage of namespaces. A pub-sub topic can be viewed as a collection of subscribers to that topic; as such, the topic name is treated as a namespace. An advantage of treating pub-sub topics as namespaces is that the namespace federation infrastructure can be used to route notification messages from publishers to subscribers. A subscription to a topic can be viewed as a namespace registration request and publish to topic can be viewed as a namespace lookup request.

In some embodiments, a namespace federation infrastructure can provide a bus-like abstraction to programmers for developing distributed applications. For example, the namespace federation infrastructure can abstract liveness—the mechanism applications employ to know when a resource they are interested in has fallen off the network. To track a given resource, the application subscribes to notifications sent to the pub-sub topic named after that resource's identity URI (i.e., its name). Any component (e.g., application) that notices that a given resource has fallen off the network can publish a liveness notification message to the topic named after the resource's identity URI, thereby informing other applications interested in tracking the resource. Since pub-sub subscriptions are federated across the namespace infrastructure and since many identity schemes are hierarchical (to capture the containment aspect of the resource from a liveness perspective), the system avoids the $n^2$ pinging problem of simple detection systems and scales very well. Further, the more interest components (e.g., applications) have in a given resource, the quicker someone will notice that it has fallen off the network, which is advantageous.

Developers can view a namespace federation infrastructure as a cloud into which resources, such as, files and event sources are registered. Applications can issue find requests against the cloud to discover registered resources. Applications can also request the cloud to subscribe on their behalf to both current and future event sources registering with the cloud. Further, applications can subscribe to pub-sub topics maintained in the cloud. Anyone can publish a notification message and the cloud takes care of forwarding the message to the subscribers of the event topic into which that message was published.

Various types of resources can be published in Namespaces, including services, devices, files, hosts, components, items in a database, metadata about metadata (schemas), and so on. A resource can have a service component hosting/backing it. For example, a file resource can have a file server as the service component for accessing the file. A conference room can have a receptionist's mailbox as the service component for scheduling a meeting.

Each resource can be associated with a resource descriptor that captures its descriptive aspect. Thus, Resource descriptors can be queried to identify resources of interest. When a resource is identified, the resource can be accessed through the resource's corresponding service aspect. The types of messages that can be sent to the service hosting/backing a resource vary from one resource type to another. For example, file servers support opening file resources and receptionists accept scheduling requests for conference rooms.

The data model for implementing resource descriptors can be versionable, extensible, and interoperable. Such a resource data model can be shared across many of the current frameworks such as Distributed File System ("DFS"), AD, and UDDI. Such a single shared data model can facilitate AD objects and DFS files (or resources form other resource management systems) being viewed as resources, federated using the namespaces approach, and that are accessed by sending messages to the services hosting them.

Accordingly, resources can be defined to have the following properties:

Resource ID: a URI that can optionally be augmented with a set of reference properties and can be stable in space and time. It can be represented as an instance of a resource reference schema. A resource ID along with resource properties can collectively represent the identity of a resource.

Descriptor: a resource-specific schema instance containing semi-static metadata about the resource. This metadata is useful for resource selection. Resource descriptor schemas can be taxonomized.

Config number: a monotonically-increasing number that identifies a particular version of resource description data. This number is incremented whenever the resource description is modified.

Instance ID: a monotonically-increasing number that identifies a particular instance of an active resource. For example, this can be the same as the boot time for service/device resources or the file modification time for file resources.

Figure 13:
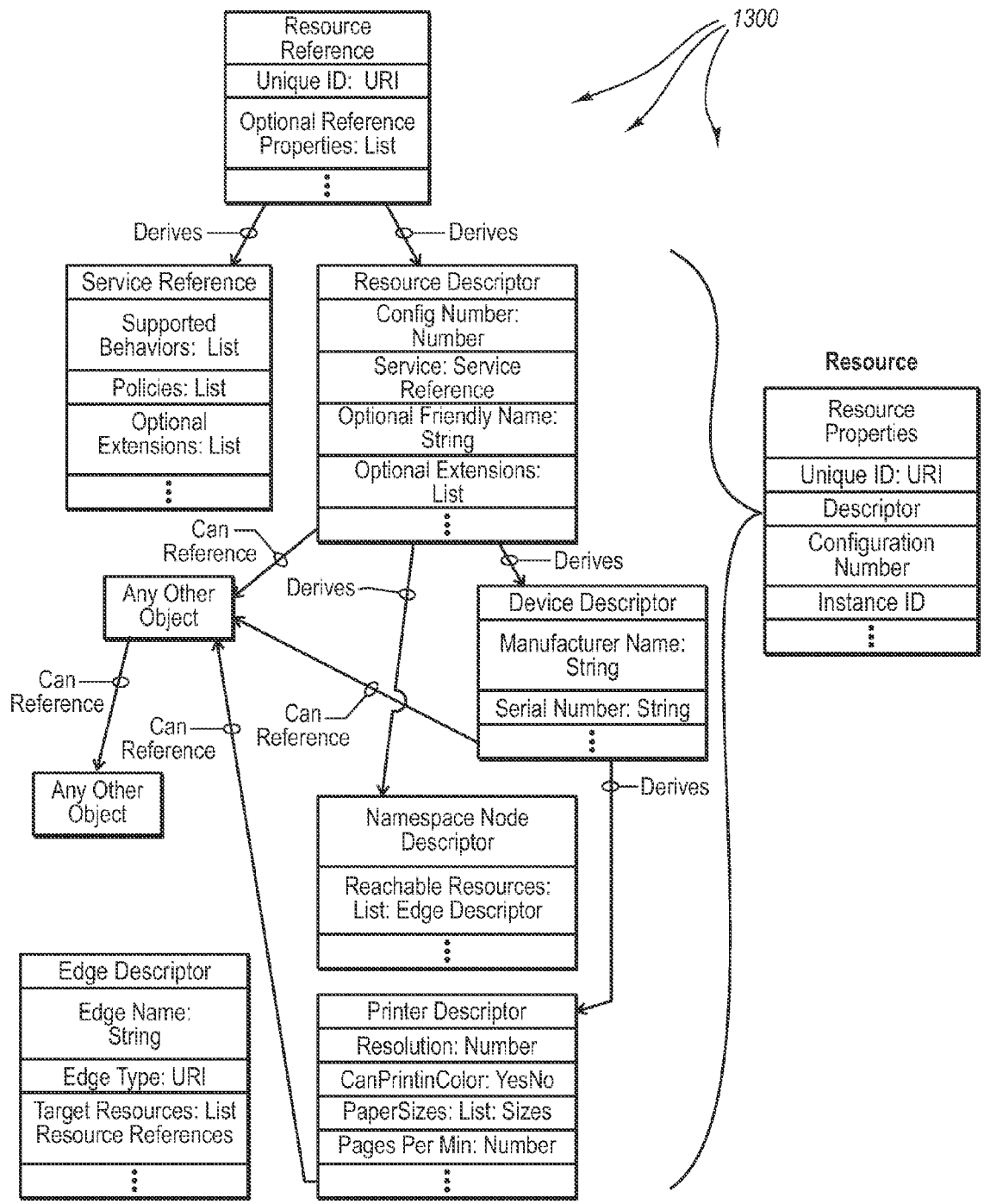
FIG. 13 illustrates an example schema taxonomy that can be used to describe a resource.

With further reference to descriptors, a device can have metadata in accordance with one or more schemas. For example, a printer can have metadata in accordance with different schemas that describe different aspects of the printer. Resource descriptor schemas can be standardized by organizations such as UPnP Forum working groups (e.g., Printer Schema can be standardized by the UPnP printer working group) and W3C. FIG. 13 depicts example taxonomy 1300 for describing a resource. Within taxonomy 1300 different schemas are generally represented as follows:

Service Reference Schema: extends a resource reference schema and specifies a list of behavior types identifying messages supported by the resource, a policy container for its assertions (such as supported transports), and a set of extensions.

Resource Descriptor Schema: extends a resource reference schema and specifies the descriptor's configuration number (see below for explanation), friendly name of the resource, the service reference of the service backing the resource, and a set of extensions.

Namespace Node Descriptor Schema: extends a resource descriptor schema and specifies the resources reachable from it as instances of an edge descriptor schema.

Edge Descriptor Schema: specifies a locally-scoped edge name, the edge type, and target resources.

Device Descriptor Schema: extends a resource descriptor schema and specifies the serial number and manufacturer name.

Printer Descriptor Schema: extends the device descriptor schema and specifies printer-specific properties such as resolution, ability to print in color, pages per minute, and supported paper sizes.

Any of the information defined in any of the above description schemas can be included in a query for identifying resources in a federation namespace infrastructure. For example, the descriptor data can be searched and navigated using a filter (or query) expression. For example, one can filter by the type of descriptor schema or field values, navigate to instances reachable from its reference fields, apply a sub-filter on those, and so on. In some embodiments, XPath-based filter expressions are used. Referring back to FIG. 6, using an XPath syntax, a filter expression that operates over the description data specified by the resource description schemas can be used to locate a printer in Location:/Bldg42/Floor1 that can print in color.

A namespace can specify a filter expression, in the form of a URI segment parameter, for the fields/attributes defined on a namespace node resource for selection and traversal. For example, the namespace Location:/Bldg42/Floor1/Room1226;employee="employee1"/printer would traverse namespace node resource "Room 1226" only if the descriptor of "Room 1226" has a "employee" field with the value "employee1". Similarly, the namespace Organization:/Product/DevicesTeam;building="Bldg33"/Dev/Computer604;printer="co lor" would traverse namespace node resource "Devices Team" only if its descriptor has a "building" field with the value "Bldg 33" (thus identifying a first portion of resources) and would select namespace node resource "Computer 604" only if its descriptor has a "printer" field with the value "color" (meant to identify that a color printer has been attached to it).

As previously described, namespace managers can be assigned a unique numeric identifier, such as, for example, a 160-bit ID. In some embodiments, the unique identifier is generated from hashing one or more namespace manager characteristics, such as, for example, Domain Name Services ("DNS") name, location, department, etc. Any of a variety of different hashing functions, such as, for example, SHA, can be used to generate a unique ID.

Utilizing the unique namespace manager IDs the following functions can be provided for routing namespace information in a namespace federation infrastructure:

RouteNumerically(V, Msg): Given a value V from the value domain of namespace manager identities and a message "Msg," deliver the message to namespace manager X whose identity can be mapped to V using the mapping function.

Neighborhood(X, S): Neighborhood is the set of namespace managers on the either side of namespace manager X (e.g., on ring 306) with cardinality equal to S.

Embodiments of the present invention can also utilize proximity criterion of namespace managers participating in a federation. Proximity criteria can be defined as an equivalence relation that partition the set of federating namespace managers into a disjoint set of classes (or partitions). Generally, a relation R on a set S is an equivalence relation if it satisfies the following properties:

Reflexive: x in an element of S→x R x
Symmetric: Given x, y elements of S, x R y→y R x
Transitive: Given x, y, z elements of S, x R y^y R z→x R z Embodiments of the present invention can support a plurality of different proximity criteria and proximity criteria can be arranged in a partial order. For example, a criterion that considers all the namespace node resources belonging to "Corporation 1" to be proximally close precedes the criterion that considers all the namespace managers within "Corporation 1, Location A" to be proximally close. This results from set of namespace managers considered proximally close by the former criterion (belonging to "Corporation A") being a super set of the set of namespace managers considered proximally close by the latter criterion (belonging to "Corporation 1, Location A"). On the other hand, there is no ordering relationship between the criterion that considers all the namespace managers within "Corporation 1, Location A" as proximally close and the criterion that considers all the namespace managers within "Corporation 1, Location A" as proximally close.

Taking proximity considerations into account when computing routing namespace managers for each namespace manager in a federation results in an increased chance that each routing hop on the path to the final destination remains within the proximity of the namespace manager that originated the request. Further, significant progress in closing the distance between the namespace managers in the numerical space can still be made.

Utilizing unique IDs along with proximity criterion, the following additional function can be provided for routing namespace information in a namespace federation infrastructure:

RouteProximally(V, Msg, P): Given a value V from the domain of namespace manager identities and a message "Msg," deliver the message to the namespace manager Y whose identity can be mapped to V among the namespace managers considered equivalent by the proximity criteria P.

When a provider/subscriber registers at namespace branch with a namespace manager, the registration request is sent (and potentially routed) to a partner namespace manager responsible for maintaining registration information for the namespace tree specified in the registration request. Alternately, it may be that the namespace manager that originates the namespace registration request into the fabric is the responsible namespace manger. The method 710 will be described with respect to the namespace federation infrastructure of FIG. 1 and the namespaces of FIG. 6.

Method 710 includes an act of receiving a namespace registration request to register a namespace branch, the namespace registration request including a namespace identifier that identifies the namespace branch (act 711). For example, namespace manager 112 can receive registration request 132, including a namespace ID 142, from provider 131. Since, namespace manager 112 is not a peer namespace manager, namespace manager 112 can forward registration request 132 to namespace manager 102. Namespace manager 112 can canonicalize namespace ID 142 per rules identified by its scheme before transferring registration request 132 over the namespace federation infrastructure 100.

Method 710 includes an act of generating an at least one-way equivalent identification value based on the scheme portion of the namespace identifier along with at least part of the path portion of the namespace identifier (act 712). For example, namespace manager 102 can generate a hash 152 based on the scheme portion of namespace ID 142 along with at least part of the path portion of namespace ID 142. Any of a variety of different hashing functions, such as, for example, SHA, can be used to generate a hash value from portions of a namespace string. Generating a hash value for a namespace string can vary based on the configuration of the namespace federation infrastructure.

For non-hierarchical Namespace schemes such as "uuid" (e.g., identified by the absence of the ":/" character sequence after the scheme), a hash can be generated over the entire Namespace. For example, the entire namespace string "uuid: a36fab9c-9c7f-42c3-97d8-36cd57e9bd29" may be used to generate a SHA hash value.

Hierarchical namespaces can be authoritative or non-authoritative, with the two distinguished, for example, by the respective character sequences "://" and ":/" following the scheme component. For authoritative namespaces such as "name", a hash is generated over the scheme part, followed by the "://" character sequence, the authority component, and the first path component of the namespace. For example, the portion "name://red.prn.xrx:200/printers" of the namespace string "name://red.prn.xrx:200/printers/b42-1749-a" may be used to generate a SHA hash value. For non-authoritative namespaces such as the "location" scheme of FIG. 6, a hash can be generated over the scheme part, followed by the ":/" character sequence and the first path component of the Namespace. For example, the portion "location:/Bldg42" of the namespace string "location:/Bldg42/Floor1/Room1226"

Method 710 includes an act of sending the namespace registration request to a namespace manager having an identifier that is numerically closer to the at least one-way equivalent numeric identification value than the identifiers of other namespace managers (act 713). For example, namespace manager 102 can invoke a RouteNumerically function supplying hash 152 and registration message 132 as input, for example, RouteNumerically(hash 152, registration message 132). Alternately, a RouteProximally function can be used. In some embodiments, the namespace registration request is sent directly and no routing occurs.

Federation namespace infrastructure 100 then utilizes federation protocols to forward the registration message to the appropriate namespace manager. For example, registration request 132 can be routed to namespace manager 103. It may be that namespace manager 103 has migrated responsibility for the namespace branch to another namespace manger. Thus, it may be that namespace manager 103 returns a referral message to namespace manager 102. Accordingly, when responsibility for the namespace branch has been referred, namespace manger 102 can receive a referral message specifying the appropriate namespace manager. Namespace manager 102 can in turn send registration request 132 to the appropriate namespace manager. One or more referrals can be encountered until a namespace manager accepts or rejects the registration request.

The method 710 includes an act of associating the namespace manager with the namespace branch (act 714). For example, namespace manager 103 can be associated with the namespace branch identified by namespace ID 142 (through provider 131). Namespace ID 142 can, for example, identify a portion of namespace 601 or namespace 602. Associations between a namespace manager and a namespace branch allow requests (e.g., lookup requests) specifying a namespace branch beneath the one specified in the registration request to be forwarded, instead of being routed, to the namespace manager specified in the association. Associations are broken when either a namespace manager failure is detected or a referral to a different namespace manager is obtained. When a failure is detected, subsequent requests are routed until a new association can be formed.

Figure 7A:
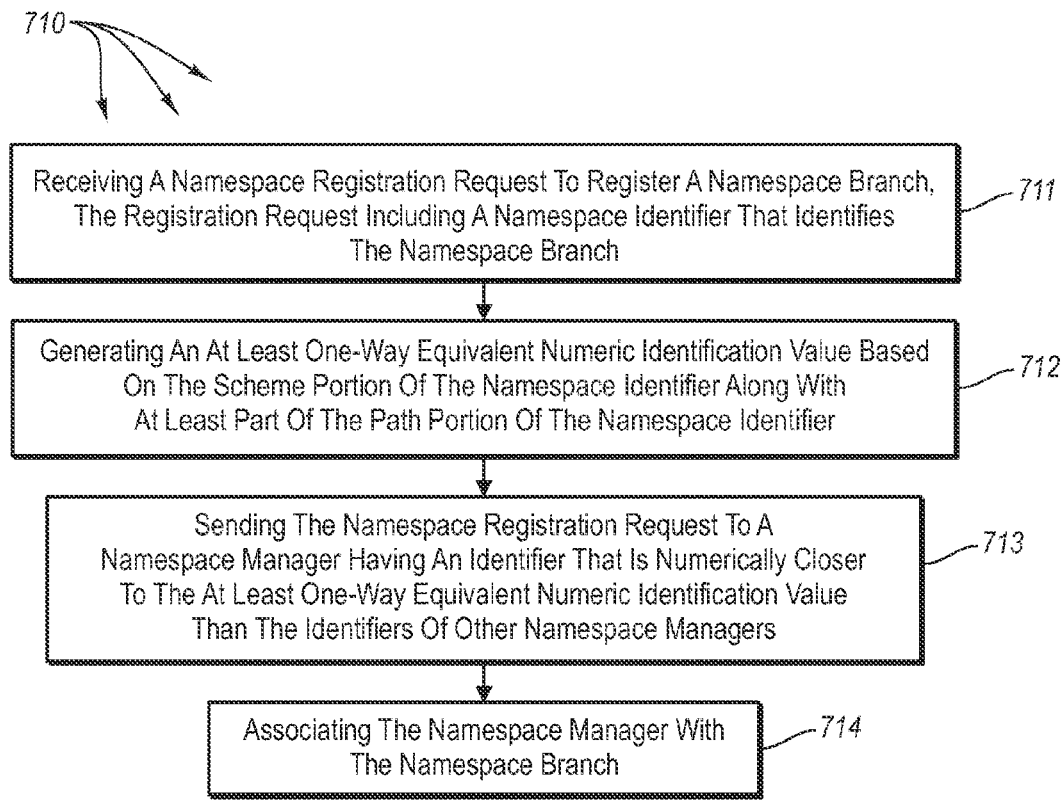
FIG. 7A illustrates an example flowchart of a method for routing a namespace registration request.
Figure 7B:
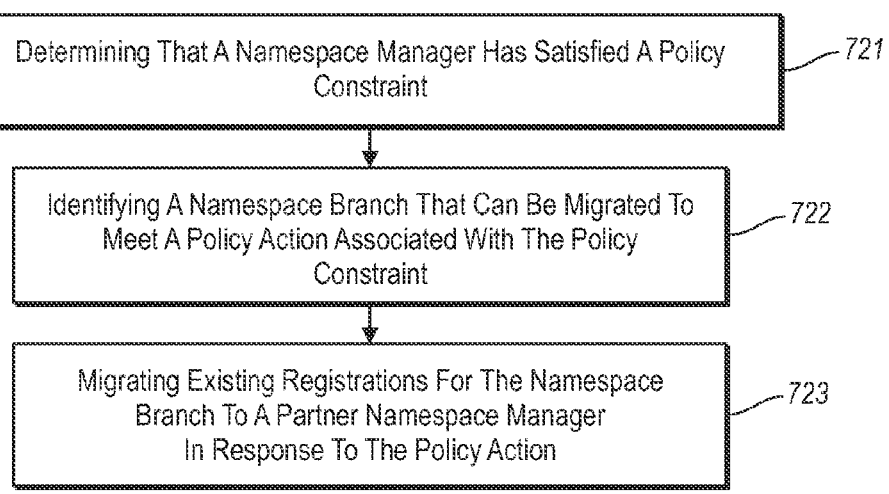
FIG. 7B illustrates an example flowchart of a method for migrating a namespace registration request.

FIG. 7B illustrates an example flowchart of a method 720 for migrating a namespace registration request. The method 720 will be described with respect to the namespace federation infrastructure of FIG. 1 and the namespaces of FIG. 6.

Method 720 includes an act of determining that a namespace manager has satisfied a policy constraint (act 721). For example, namespace manager 103 can determine that the amount of namespace information (related to federation namespace infrastructure 100) being processed at namespace manager 103 has exceeded a configured threshold. A configured threshold can be, for example, a total number of registrations maintained at a namespace manager or a total number of lookup requests being serviced at a namespace manager.

Method 720 includes an act of identifying a namespace branch that can be migrated to meet a policy action associated with the policy constraint (act 722). For example, namespace manager 103 can identify a namespace branch (e.g., corresponding to namespace ID 142) that can be migrated to reduce the namespace information processed at namespace manager 103 below a configured threshold. It may be that a namespace manager identifies a more heavily-populated and/or heavily-serviced namespace branch for migration.

Method 720 includes an act of an act of migrating existing registrations for the namespace branch to a partner namespace manager in response to the policy action (act 723). For example, namespace manager 103 can migrate existing registrations to a partner (e.g., a neighborhood) namespace manger in response to an action that is to occur to relieve the burden on the heavily-populated and/or heavily-serviced namespace branch.

Method 730 can also include an act of receiving a namespace request corresponding to the namespace branch. For example, namespace manager 103 can receive registration request 132 correspond to the namespace branch represented by namespace ID 142.

Method 720 can also include an act of taking action to redirect the namespace request to a partner namespace manager. For example, as indicated by the dotted arrow, namespace manager 103 can reroute registration request 132 to namespace manager 101. A namespace manager that migrates a namespace branch can invoke a RouteNumerically to reroute request to a different namespace manager. For example, RouteNumerically(H, migrateMsg) can be invoked to reroute requests to a namespace manager (e.g., namespace manager 101) identified by an at least one-way equivalent value of the namespace branch being migrated. For example, to migrate the branch location:/Bldg42/Floor1, namespace manager 103 generates a hash H over the string "location:/Bldg42/Floor 1", invokes RouteNumerically(H, migrateMsg) to identify the namespace manager 101 responsible for the migrated branch, and migrates all the namespace registrations underneath the migrated branch such as location:/Bldg42/Floor1/Room1226 and location:/Bldg42/Floor1/Room1119 to the identified namespace manager 101.

A namespace manager may also decide to forward all the namespace registrations encountered along the spine of the migrated namespace branch to the partner namespace manager hosting the branch. This facilitates the partner namespace manager branch servicing all the lookup requests that specify the namespace branch without the requests having to go through the migrating namespace manager, either directly or indirectly, all the time. The migrating namespace manager can leave behind a stub indicating that it has migrated registration information under the specified namespace branch. The migrating namespace manager can also revoke subscriptions, if any, for liveness notifications tracking providers/subscribers specified in the migrated registrations. Accordingly, subsequent namespace registrations under and along the spine of the migrated namespace branch received by the migrating namespace manager are forwarded to the partner namespace manager.

Figure 7C:
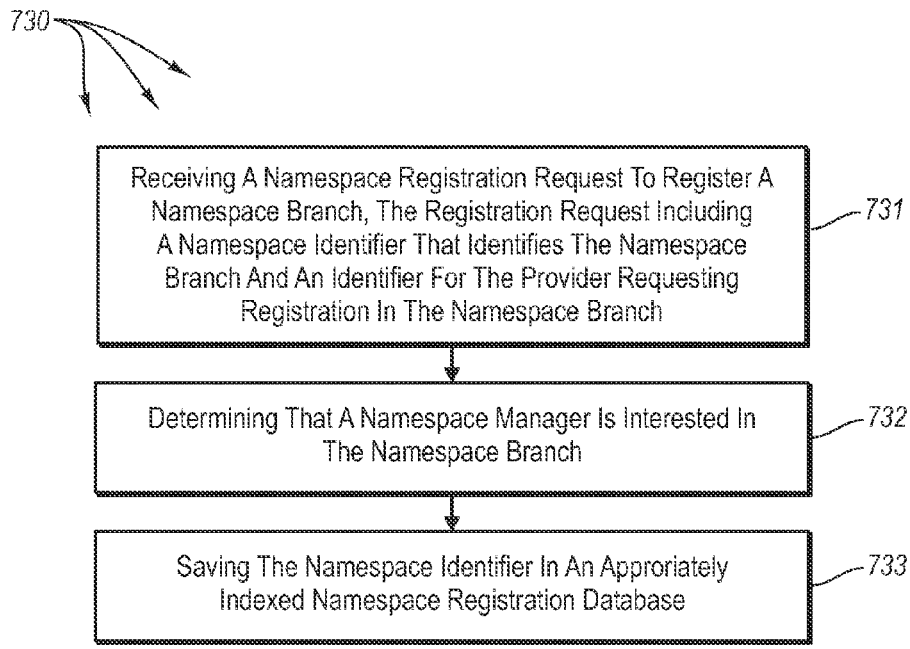
FIG. 7C illustrates an example flowchart of a method for processing a namespace registration request.

FIG. 7C illustrates an example flowchart of a method 730 for processing a namespace registration request. The method 720 will be described with respect to the namespace federation infrastructure of FIG. 1 the namespaces of FIG. 6.

Method 730 includes an act of receiving a namespace registration request to register a namespace branch, the namespace registration request including a namespace URI string that identifies the namespace branch and a unique reference or identifier for the provider (or subscriber) requesting registration in the namespace branch (act 731). For example, namespace manager 103 can receive registration request 132 that includes reference to provider 131.

Method 730 includes an act of determining that a namespace manager is interested in the namespace branch (act 732). For example, namespace manager 102 can determine if namespace manager 102 is responsible for the namespace branch represented by namespace ID 142 (e.g., Organization/Product/Messaging Team). When namespace manger 102 is not responsible, namespace manager 102 can forward the namespace registration request (e.g., registration request 132) to a responsible namespace manger (e.g., namespace manger 103) for the specified namespace branch. Alternately, when namespace manger 102 is not responsible, namespace manager 102 can send a referral message 134 to the namespace manger (e.g., namespace manager 103) that initiated the registration request (e.g., registration request 132) to instead contact the responsible namespace manager (e.g., namespace manager 101). When namespace manager 102 is responsible, namespace manager 102 can retain the namespace registration request.

Method 730 includes an act of saving the namespace identifier in an appropriately indexed namespace registration database (act 733). For example, if the namespace identifier is a URI string, it is stored in the namespace registration database index in alphabetical order with longer strings ranked higher. For example, namespace manager 103 can save namespace ID 142 in namespace registration database. The dashed line and corresponding dashed box surrounding provider 131, indicates that namespace manager 103 has referenced provider 131 as being interested in the namespace represented by namespace ID 142.

Method 730 can also include an act of determining how often the liveliness of the provider is to be subsequently verified. For example, namespace manager 103 can determine how often the liveliness of the provider 131 is to be subsequently verified. Namespace provider 103 can optionally subscribe to liveness notifications published to the pub-sub topic of provider 131 identified by ID 161. The pub-sub topic can be identified by ID 161. Alternately, if a liveness subscription is not made, the registration is assigned a time-limited lease. Provider 131 can renew registration before the lease expires by directly contacting namespace manager 103. Other liveness mechanisms can also be used.

Namespace manager and provider liveliness can be distributed across a hierarchy. A namespace manager positioned at a higher level in a hierarchy can rely on other similarly positioned namespace managers to report liveness information for corresponding lower level namespace managers and providers. For example in FIG. 1, namespace manager 103 can track the liveness of namespace manager 102 (both are root namespace managers). Namespace manager 103 can rely on namespace manager 102 to report failures of any corresponding lower level namespace managers (e.g., namespace manager 112) or providers (e.g., provider 124). Namespace manager 102 would in turn rely on namespace manager 103 to report similar type failures (e.g., failure of provider 126).

Subsequent to a successful registration (or failure) of provider 131, namespace manager 102 can send a message indicating the success (or failure) to provider 131.

From time to time, consumers (other computer systems or devices) may desire access to resources in a namespace branch that is managed by a provider. To obtain access to resources, the consumers may issue lookup requests to attempt to identify resources. Lookup requests can be received at namespace mangers and delivered to one or more appropriate providers. Generally, when a namespace manager receives a lookup request, it routes that lookup request to the partner namespace manager closest to it (as determined by some predefined proximity metric) and toward the neighborhood of the namespace manager responsible for the namespace branch specified in the request. As the registration information is replicated across the neighborhood namespace managers, the lookup request can be satisfied by any namespace manager in the neighborhood set.

Routing via the namespace manager closest to the namespace manager originating the lookup request results in improved network throughput and dynamic load balancing, since lookup requests get automatically and efficiently partitioned across the neighborhood namespace managers from the lookup request satisfaction perspective. To facilitate routing, the algorithm for mapping namespace IDs specified in lookup requests can be essentially the same as the algorithm for mapping namespace IDs specified in registration requests. For example, a 1:1 mapping from the value domain of the namespace identities to the namespace managers can be used to map namespace IDs for both lookup and registration requests.

Figure 8A:
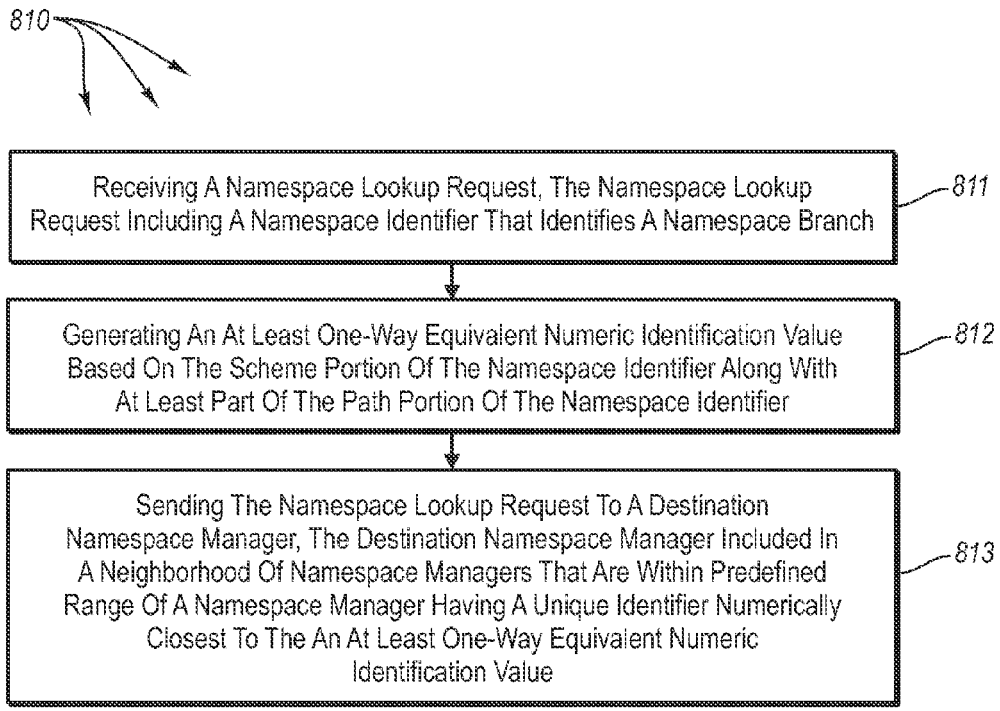
FIG. 8A illustrates an example flowchart of a method for routing a namespace lookup request.

FIG. 8A illustrates an example flowchart of a method 810 for routing a namespace lookup request. The method 810 will be described with respect to the federation namespace infrastructure of FIG. 1 and the namespaces of FIG. 6.

Method 810 includes an act of receiving a namespace lookup request that includes a namespace identifier identifying a namespace branch (act 811). For example, namespace manger 103 can receive lookup request 133. Lookup request 133 can specify namespace ID 143 that identifies a branch of namespace tree 602, such as, for example, Location:/Bldg 42/Floor 2/ConfRoom 2005.

Method 810 includes an act of generating an at least one-way equivalent numeric identification value based on the namespace identifier (act 812). For example, namespace manager 103 can hash the scheme portion of the namespace ID 143 along with at least part of the path portion of the namespace ID 143 to produce hash 153.

Method 810 includes an act of sending the namespace lookup request to a destination namespace manager (act 813). The destination namespace manager included in a neighborhood of namespace managers that are within a predefined range of a namespace manager having a unique identifier numerically closest to the at least one-way equivalent numeric identification value. To route lookup request 133, it may be that namespace manager 103 invokes a RouteProximally (or RouteNumerically) function. For example, namespace manager 103 can invoke RouteProximally(hash 153, lookup message 133, Proximity criterion P) to route lookup message 133 to a partner namespace manager 102 because it is identified as the one having a unique ID numerically closest among namespace managers considered proximally close to namespace manager 103 under the specified proximity criterion P. From the RouteProximally function, namespace manger 102 can be identified.

The method 810 can also include an act of forwarding the namespace lookup request for delivery to one or more providers interested in the namespace branch. For example, namespace manager 103 can forward lookup request 133 to namespace manager 102. Namespace manager 102 can forward lookup request 133 to provider 131.

Figure 8B:
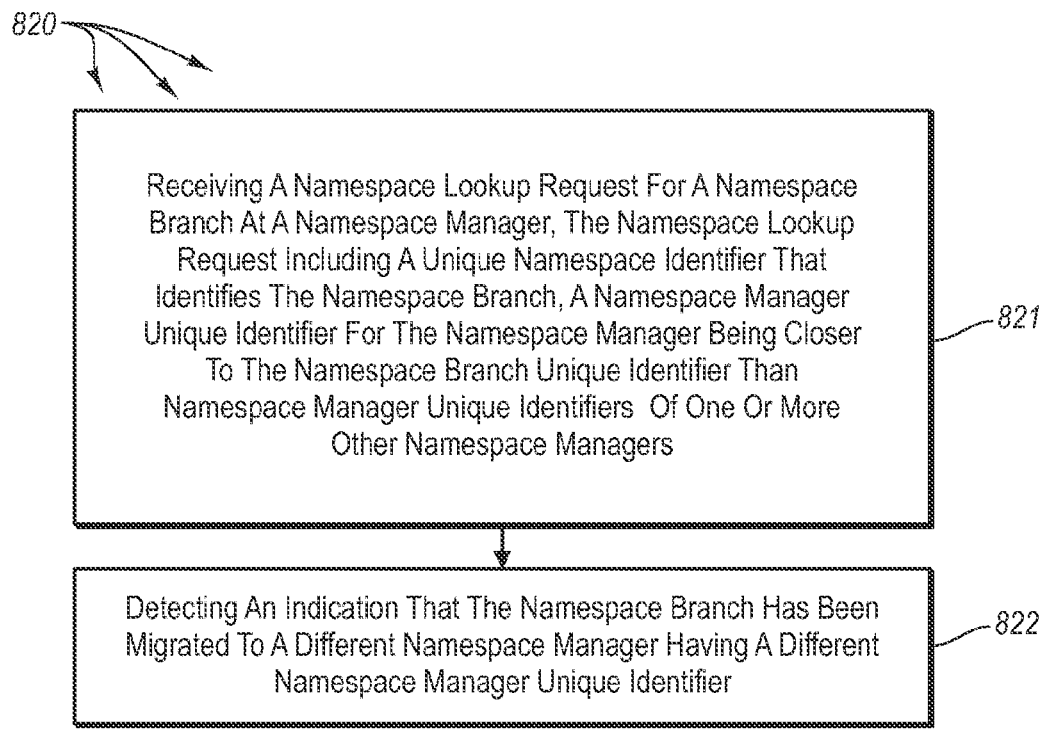
FIG. 8B illustrates an example flowchart of a method for migrating a namespace lookup request.

FIG. 8B illustrates an example flowchart of a method 820 for migrating a namespace lookup request. The method 820 will be described with respect to the namespace federation infrastructure of FIG. 1 and the namespaces of FIG. 6.

Method 820 includes an act of receiving a namespace lookup request for a namespace branch (act 821). The namespace lookup request includes a unique namespace identifier that identifies the specific namespace branch. For example, a namespace identifier may be the URI ID 143. Further, the received namespace lookup request optionally includes an at least one-way equivalent numeric identification value that was generated based on the identifier for the specified namespace branch. For example, it may be that hash 153 is generated from the scheme and at least part of the path portions of the namespace ID 143. The namespace manager identifier for the namespace manager is closer to a namespace branch identifier than namespace branch identifiers of one or more other namespace managers. Namespace manager 102 can receive lookup request 133 as a result of the unique ID 172 being closer to hash 153 than the unique identifiers (e.g., ID 174) of other namespace managers in namespace federation infrastructure 100.

Method 820 includes an act of detecting an indication that the namespace branch has been migrated to a different namespace manager having a different namespace branch identifier (act 822). For example, namespace manager 102 can detect the presence of a stub indicating that the namespace branch represented by namespace ID 143 has been migrated to namespace manager 101.

Method 820 can also include act of at least informing an originating namespace manager that the namespace branch has been migrated to the different namespace manager. For example, namespace manager 102 can at least inform namespace manger 103 that the namespace branch represented by namespace ID 143 has been migrated. For example, namespace manager 102 can send referral message 134 to namespace manager 103 indicating that namespace manger 103 should contact namespace manger 101 or initiate a new lookup request 132 for the migrated branch.

Namespace manager 103 can follow the instructions from namespace manager 102 that are included in the referral message.

Namespace manager 102 can alternately reroute lookup request 133 itself by invoking RouteProximally(New ID H, lookup request 133, Proximity Criteria P) on itself. For example, New ID H can be generated by hashing the entire component migrated namespace branch as opposed to the original hash value, which was generated by only hashing the schema part and the first part of the path component. Invoking RouteProximally can cause lookup request 133 to be routed to the other namespace manager for delivery to namespace manager 101 (as indicated by the dashed arrow that includes lookup request 133).

Figure 8C:
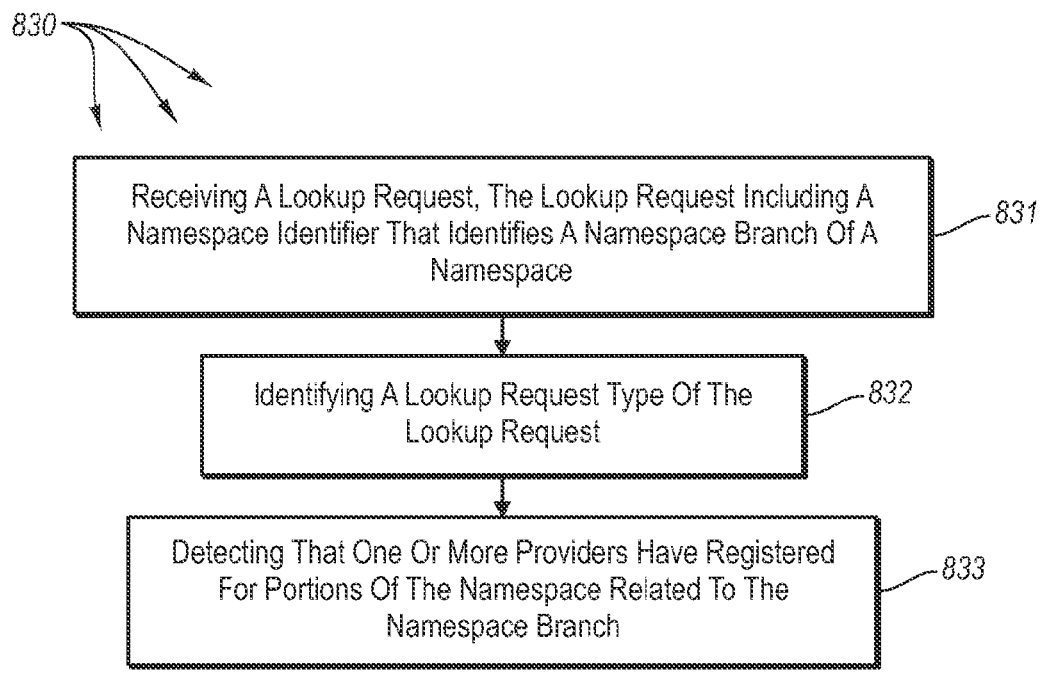
FIG. 8C illustrates an example flowchart of a method for processing a namespace lookup request.

FIG. 8C illustrates an example flowchart of a method 830 for processing a namespace lookup request. The method 830 will be described with respect to the namespace federation infrastructure of FIG. 1 and the namespaces of FIG. 5.

Method 830 includes an act of receiving a namespace lookup request that includes a namespace identifier identifying a namespace branch of a namespace (act 831). For example, namespace manager 102 can receive namespace lookup request 133 that includes namespace ID 143. Namespace ID 143 can identify a namespace branch of namespace infrastructure 500.

Method 830 includes an act of identifying namespace lookup request type of the namespace lookup request (act 832). For example, namespace manager 102 identifies the namespace lookup request type of lookup request 133. In some embodiments, a namespace lookup request type can be a generic request type (e.g., to any namespace branch) or targeted request type (e.g., to a specific namespace branch).

Method 830 includes act of detecting that one or more providers have registered for portions of the namespace related to the namespace branch (act 833). For example, namespace manager 102 can detect that one or more providers have registered for portions of the namespace related to the namespace branch represented by namespace ID 143. Referring now to FIG. 5, if namespace ID 143 is Location:/ Corporate Buildings/Bldg 50/Floor 1, providers 501, 502, and 503 can be identified. Provider 502 has registered for Room 1304 (below Floor 1 in namespace tree 500), provider 502 is registered for Bldg 50 (above floor 1 in namespace tree 500), and provider 503 that is registered for Floor 1 in namespace tree 500.

Method 830 can also include an act of forwarding the namespace lookup request to at least one provider based on the identified namespace lookup request type. For example, namespace manager 102 can forward lookup request 133 to one or more of providers 501, 502, and 503.

For a generic request, namespace manager 102 forwards the request to all the providers whose registration namespace branch is either a prefix or a suffix of the one specified in the lookup request. For example, namespace manager 102 could forward namespace lookup request 133 to providers 501, 502, and 503, if namespace ID 143 was Location:/Corporate Buildings/Bldg 50/Floor 1. For a targeted request, namespace manager forwards the request only to the provider whose registration namespace branch is the maximal-prefix of the one specified in the lookup request. However, for both generic and targeted types, if more than one copy of a given provider such as 501 is available, namespace manager 102 forwards the request to the provider closer to the origin of the lookup request (in this case, namespace manager 103) under the chosen proximity metric.

Namespace manager 103 can create an association between the namespace branch represented by namespace ID 143 and namespace manger 102 (e.g., storing it a namespace database). Such an association facilitates namespace lookup requests specifying a namespace branch beneath the one specified in the association (e.g., beneath Location:/Corporate Buildings/Bldg 50/Floor 1) to be forwarded, instead of being routed, to namespace manager 102. Associations are broken when either a target namespace manger failure is detected or a referral to a different namespace manger is obtained. In the former case, subsequent requests are routed until a new association can be formed.

Figure 9:
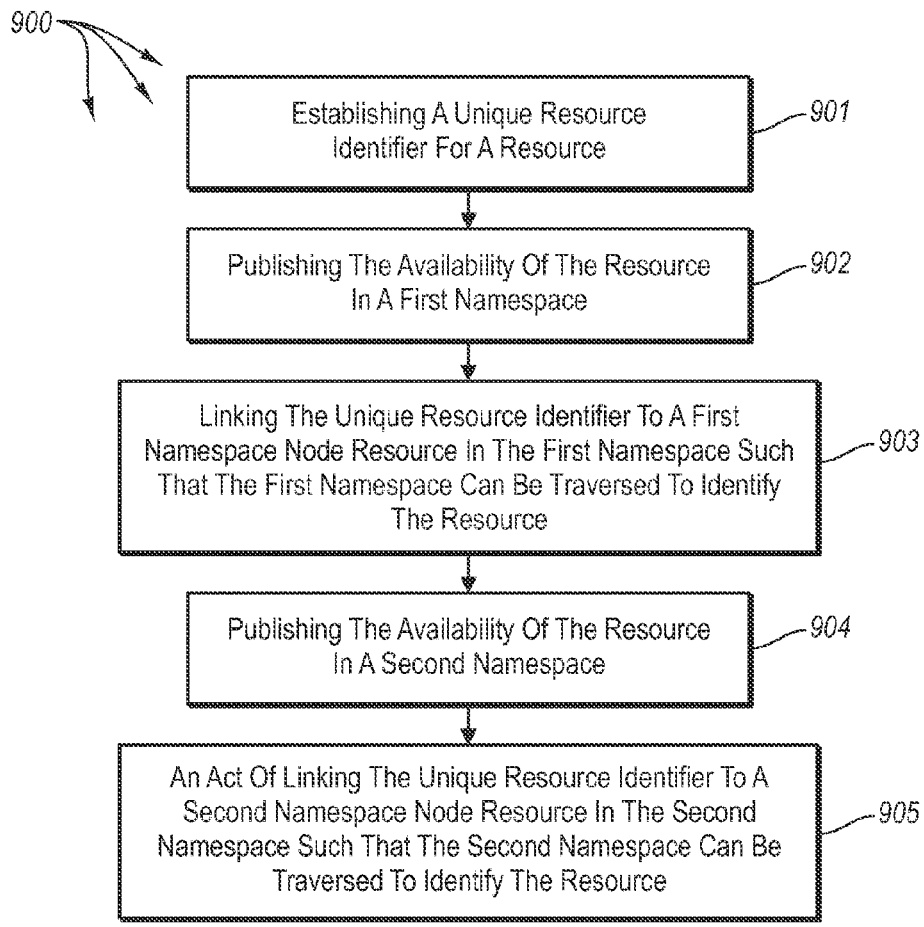
FIG. 9 illustrates an example flowchart of a method for a resource to participate in multiple namespaces.

FIG. 9 illustrates an example flowchart of a method 900 for a resource to participate in multiple namespaces. Method 900 will be described with respect to namespace trees in FIG. 6.

Method 900 includes an act of establishing a unique resource identifier for a resource (act 901). Act 901 can include establishing a path portion of a URI that corresponds to the resource. For example, an identifier of "printer 603" can be established for a printer.

Method 900 includes an act publishing the availability of the resource in a first namespace (act 902). For example, printer 603 can publish its availability in namespace tree 601. Method 900 includes an act of linking the unique resource identifier to a first namespace node resource in the first namespace such that the first namespace can be traversed to identify the resource (act 903). For example, namespace segment 631 can be established to link printer 603 to the "Dev Team" namespace node resource. Accordingly, namespace tree 601 (and the "Dev Team" namespace node resource) can be traversed to identify printer 603.

Method 900 includes an act publishing the availability of the resource in a second namespace (act 904). For example, printer 603 can publish its availability in namespace tree 602. Method 900 includes an act of linking the unique resource identifier to a second namespace node resource in the second namespace such that the second namespace can be traversed to identify the resource (act 905). For example, namespace segment 632 can be established to link printer 603 to the "Room 1226" namespace node resource. Accordingly, namespace tree 602 (and the "Room 1226" namespace node resource) can also be traversed to identify printer 603.

Figure 10:
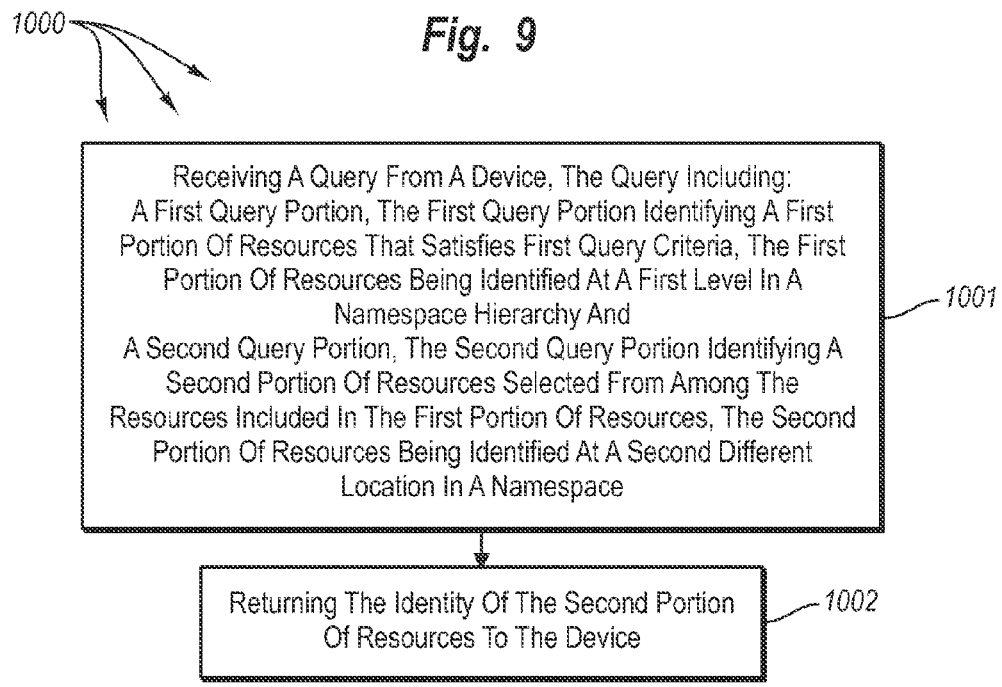
FIG. 10 illustrates an example flowchart of a method for identifying a subset of resources in the namespace federation infrastructure.

FIG. 10 illustrates an example an example flowchart of a method 1000 for identifying a subset of resources in the namespace federation infrastructure. Method 1000 will be described with respect to namespace trees in FIG. 6.

Method 1000 includes an act receiving a query from a device (act 1001). For example, a provider for namespace tree 602 can receive a query from a device that is network connectable to the provider. The query includes a first query portion identifying a first portion of resources that satisfies first query criteria at a first level in a namespace hierarchy. For example, a first query portion can identify a first portion of resources that satisfies first query criteria after traversing namespace segment "Floor 2" (in namespace tree 602). A first portion of resources can be, for example, employees, and first criteria can also include, for example, assigned to the "Messaging Team". Thus, the first query portion can identify all the employees assigned to the "Messaging Team" that work on Floor 2 (of Bldg 42). In some embodiments, the first query criteria are utilized to navigate through the properties of resources that reference the first portion of resources.

The query includes a second query portion identifying a second portion of resources selected from among the resources included in the first portion of resources. For example, a second query portion can identify a second portion of resources that satisfies second query criteria after traversing namespace segment "Room 2005" (in namespace tree 602). A second portion of resources can be, for example, administrators, and second criteria can be, for example, devices. Thus, the second query portion can identify printer administrators with office cubicles in Room 2005. In some embodiments, the second query criteria are utilized the to navigate through the properties of the first portion of resources that reference the second portion of resources.

Accordingly, providing the resources identified from the first query portion as input to the second query portion, the results of the received query can (depending on the field definitions in the resources schemas) identify printer administrators with offices in $2^{nd}$ floor, Room 2005, and assigned to Messaging Team.

Method 1000 includes an act of returning the identity of the second portion of resources to the device (act 1002). For example, the provider for namespace tree 602 can return the identity of administrators of devices in ConfRoom 2005 that are owned by Messaging Team employees on Floor 2 to the network connectable device.

Figure 12:
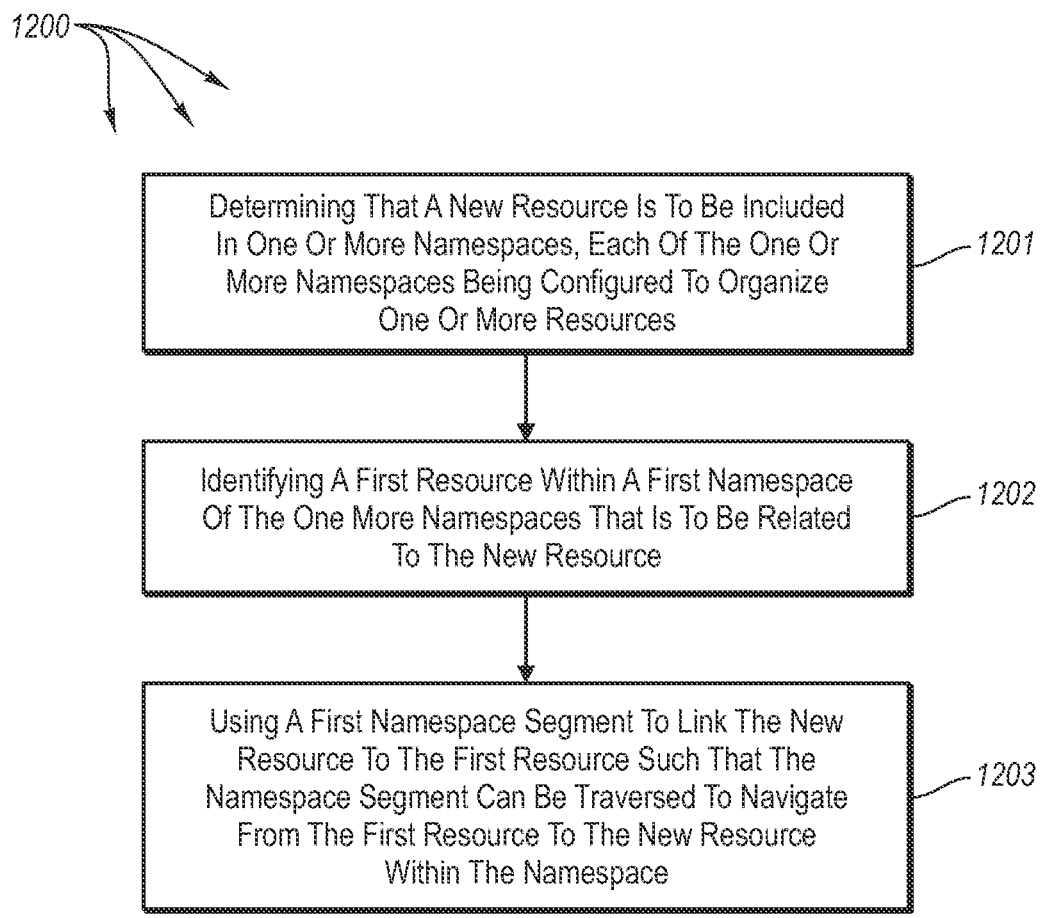
FIG. 12 illustrates an example flowchart of a method for organizing a plurality of resources.

FIG. 12 illustrates an example flowchart of a method 120 for organizing a plurality of resources. The method 1200 will be described with respect to the namespace infrastructure 600 in FIG. 6.

Method 1200 includes an act of determining that a new resource is to be included in one or more namespaces, each of the one or more namespaces being configured to organize one or more resources (act 1201). For example, it can be determined that printer 603 is to be included in namespace 601 and/or namespace 602. Method 1200 includes an act of identifying a first resource within a first namespace of the one more namespaces that is to be related to the new resource (act 1202). For example, it can be identified that room 1226 in namespace 602 is to be related to printer 603. Similarly, it can be identified that Dev Team in namespace 601 is to be related to printer 603.

Method 1200 includes an act of using a first namespace segment to link the new resource to the first resource such that the namespace segment can be traversed to navigate from the existing resource to the new resource within the namespace (act 1203). For example, namespace segment 632 can be used to link printer 603 to Room 1226 such that namespace segment 632 can be traversed to navigate form Room 1226 to printer 603. Similarly, namespace segment 631 can be used to link printer 603 to Dev Team such that namespace segment 631 can be traversed to navigate form Dev Team to printer 603.

Figure 11:
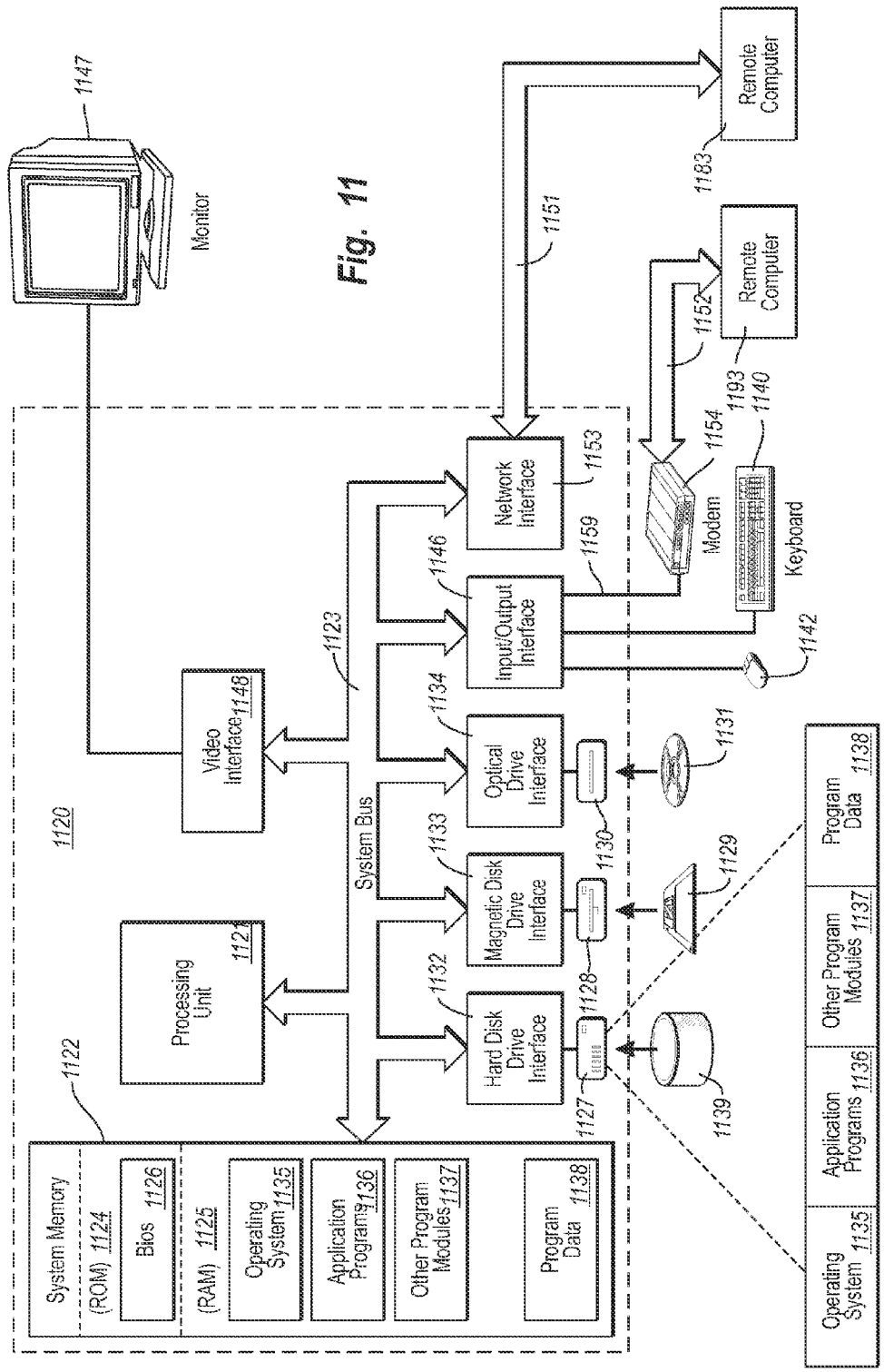
FIG. 11 illustrates a suitable operating environment for the principles of the present invention.

FIG. 11 and the following discussion are intended to provide a brief, general description of an example suitable computing environment in which the invention may be implemented. Although not required (e.g., when implemented in hardware), the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 11, an example system for implementing the invention includes a general-purpose computing device in the form of computer system 1120, including a processing unit 1121, a system memory 1122, and a system bus 1123 that couples various system components including the system memory 1122 to the processing unit 1121. Processing unit 1121 can execute computer-executable instructions designed to implement features of computer system 1120, including features of the present invention. The system bus 1123 may be any of several types of bus structures including a memory bus or memory controller, a peripheral bus, and a local bus using any of a variety of bus architectures. The system memory includes read only memory ("ROM") 1124 and random access memory ("RAM") 1125. A basic input/output system ("BIOS") 1126, containing the basic routines that help transfer information between elements within computer system 1120, such as during start-up, may be stored in ROM 1124.

The computer system 1120 may also include magnetic hard disk drive 1127 for reading from and writing to magnetic hard disk 1139, magnetic disk drive 1128 for reading from or writing to removable magnetic disk 1129, and optical disk drive 1130 for reading from or writing to removable optical disk 1131, such as, or example, a CD-ROM or other optical media. The magnetic hard disk drive 1127, magnetic disk drive 1128, and optical disk drive 1130 are connected to the system bus 1123 by hard disk drive interface 1132, magnetic disk drive-interface 1133, and optical drive interface 1134, respectively. The drives and their associated computer-readable media provide nonvolatile storage of computer-executable instructions, data structures, program modules, and other data for the computer system 1120. Although the example environment described herein employs magnetic hard disk 1139, removable magnetic disk 1129 and removable optical disk 1131, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 1139, magnetic disk 1129, optical disk 1131, ROM 1124 or RAM 1125, including an operating system 1135, one or more application programs 1136, other program modules 1137, and program data 1138. A user may enter commands and information into computer system 1120 through keyboard 1140, pointing device 1142, or other input devices (not shown), such as, for example, a microphone, joy stick, game pad, scanner, or the like. These and other input devices can be connected to the processing unit 1121 through input/output interface 1146 coupled to system bus 1123. Input/output interface 1146 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 1147 or other display device can also be connected to system bus 1123 via video interface 1148. Speakers 1169 or other audio output device is also connected to system bus 1123 via audio interface 1149. Other peripheral output devices (not shown), such as, for example, printers, can also be connected to computer system 1120.

Computer system 1120 is connectable to networks, such as, for example, an office-wide or enterprise-wide computer network, a home network, an intranet, and/or the Internet. Computer system 1120 can exchange data with external sources, such as, for example, remote computer systems, remote applications, and/or remote databases over such networks.

Computer system 1120 includes network interface 1153, through which computer system 1120 receives data from external sources and/or transmits data to external sources. As depicted in FIG. 11, network interface 1153 facilitates the exchange of data with remote computer system 1183 via link 1151. Network interface 1153 can logically represent one or more software and/or hardware modules, such as, for example, a network interface card and corresponding Network Driver Interface Specification ("NDIS") stack. Link 1151 represents a portion of a network (e.g., an Ethernet segment), and remote computer system 1183 represents a computer system of the network.

Likewise, computer system 1120 includes input/output interface 1146, through which computer system 1120 receives data from external sources and/or transmits data to external sources. Input/output interface 1146 is coupled to modem 1154 (e.g., a standard modem, a cable modem, or digital subscriber line ("DSL") modem) via link 1159, through which computer system 1120 receives data from and/or transmits data to external sources. As depicted in FIG. 11, input/output interface 1146 and modem 1154 facilitate the exchange of data with remote computer system 1193 via link 1152. Link 1152 represents a portion of a network and remote computer system 1193 represents a computer system of the network.

While FIG. 11 represents a suitable operating environment for the present invention, the principles of the present invention may be employed in any system that is capable of, with suitable modification if necessary, implementing the principles of the present invention. The environment illustrated in FIG. 11 is illustrative only and by no means represents even a small portion of the wide variety of environments in which the principles of the present invention may be implemented.

In accordance with the present invention, namespace managers, providers, and resources as well as associated data, including namespace databases, namespace identifiers and strings, hashes, resource identifiers, routing tables, and namespace trees, may be stored and accessed from any of the computer-readable media associated with computer system 1120. For example, portions of such modules and portions of associated program data may be included in operating system 1135, application programs 1136, program modules 1137 and/or program data 1138, for storage in system memory 1122.

When a mass storage device, such as, for example, magnetic hard disk 1139, is coupled to computer system 1120, such modules and associated program data may also be stored in the mass storage device. In a networked environment, program modules depicted relative to computer system 1120, or portions thereof, can be stored in remote memory storage devices, such as, system memory and/or mass storage devices associated with remote computer system 1183 and/or remote computer system 1193. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. At a first namespace manager in a namespace federation infrastructure, a computer-implemented method for migrating a namespace branch, the method comprising:
   receiving a first namespace registration request from a provider to register a resource in a first namespace branch, the first namespace registration request including a namespace string that identifies the first namespace branch and a unique identifier for the provider requesting registration of the resource in the first namespace branch, the first namespace branch being one branch in a plurality of hierarchically-arranged namespace branches of a namespace tree that are managed by a plurality of namespace managers, each namespace branch corresponding to at least one resource within a hierarchical arrangement of a plurality of resources, each namespace branch being registered to a different corresponding provider of a plurality of providers;
   determining that the first namespace manager has satisfied a policy action associated with a policy constraint based on a processing load of the first namespace manager and based on receiving the first namespace registration request;
   identifying, based on determining that the first namespace manager has satisfied the policy processing constraint, a second namespace branch that is being managed by the first namespace manager and that can be migrated to a partner second namespace manager of the plurality of namespace managers, to reduce the processing load of the first namespace manager so that the first namespace manager can meet the policy action associated with the policy constraint;
   migrating the second namespace branch to the partner second namespace manager in response to the policy action, including migrating existing namespace registrations for the second namespace branch; and
   subsequent to migrating the second namespace branch to the partner second namespace manager, the first namespace manager performing the following:
      processing the first namespace registration request, to register the resource in the first namespace branch under the first namespace manager;
      recording a stub indicating that the second namespace branch has been migrated to the partner second namespace manager;
      revoking one or more subscriptions for liveness notifications for tracking providers and subscribers in the migrated second namespace branch;
      receiving a second namespace registration request to register a resource in the second namespace branch that was migrated; and
      redirecting, based on the stub, the second registration request to the partner second namespace manager.

2. The method as recited in claim 1, wherein determining that the first namespace manager has satisfied the policy action associated with the policy constraint comprises determining that the amount of namespace information being processed at the first namespace manager has exceeded a configured threshold.

3. The method as recited in claim 2, wherein the configured threshold comprises a total number of registrations maintained at the namespace manager.

4. The method as recited in claim 1, wherein the second namespace branch is migrated to reduce the namespace information processed at the first namespace manager below a configured threshold.

5. The method as recited in claim 4, wherein the first namespace manager identifies a more heavily-populated or heavily-serviced namespace branch for migration.

6. The method as recited in claim 1, further comprising forwarding at least a portion of namespace registrations encountered along a spine of the migrated second namespace branch to the partner second namespace manager hosting the migrated second namespace branch, such that the partner second namespace manager is configured to service the lookup requests that specify the migrated second namespace branch without the requests having to go through the first namespace manager.

7. One or more hardware storage devices having stored thereon computer executable instructions that, when executed by one or more processors of a first namespace manager, implement a method for migrating a namespace branch, the method comprising:
   receiving a first namespace registration request from a provider to register a resource in a first namespace branch, the first namespace registration request including a namespace string that identifies the first namespace branch and a unique identifier for the provider requesting registration of the resource in the first namespace branch, the first namespace branch being one branch in a plurality of hierarchically-arranged namespace branches of a namespace tree that are managed by a plurality of namespace managers, each namespace branch corresponding to at least one resource within a hierarchical arrangement of a plurality of resources, each namespace branch being registered to a different corresponding provider of a plurality of providers;
determining that the first namespace manager has satisfied a policy action associated with a policy constraint based on a processing load of the first namespace manager and based on receiving the first namespace registration request;
identifying, based on determining that the first namespace manager has satisfied the policy processing constraint, a second namespace branch that is being managed by the first namespace manager and that can be migrated to a partner second namespace manager of the plurality of namespace managers, to reduce the processing load of the first namespace manager so that the first namespace manager can meet the policy action associated with the policy constraint;
migrating the second namespace branch to the partner second namespace manager in response to the policy action, including migrating existing namespace registrations for the second namespace branch; and
subsequent to migrating the second namespace branch to the partner second namespace manager, the first namespace manager performing the following:
processing the first namespace registration request, to register the resource in the first namespace branch under the first namespace manager;
recording a stub indicating that the second namespace branch has been migrated to the partner second namespace manager;
revoking one or more subscriptions for liveness notifications for tracking providers and subscribers in the migrated second namespace branch;
receiving a second namespace registration request to register a resource in the second namespace branch that was migrated; and
redirecting, based on the stub, the second registration request to the partner second namespace manager.

8. The one or more hardware storage devices as recited in claim 7, wherein determining that the first namespace manager has satisfied the policy action associated with the policy constraint comprises determining that the amount of namespace information being processed at the first namespace manager has exceeded a configured threshold.

9. The one or more hardware storage devices as recited in claim 7, further comprising forwarding at least a portion of namespace registrations encountered along a spine of the migrated second namespace branch to the partner second namespace manager hosting the migrated second namespace branch, such that the partner second namespace manager is configured to service the lookup requests that specify the migrated second namespace branch without the requests having to go through the first namespace manager.

10. The one or more hardware storage devices as recited in claim 7, wherein the second namespace branch is migrated to reduce the namespace information processed at the first namespace manager below a configured threshold.

11. The one or more hardware storage devices as recited in claim 7, wherein the first namespace manager identifies a more heavily-populated or heavily-serviced namespace branch for migration.

12. A computer system, comprising:
one or more hardware processors; and
one or more computer-readable media having stored thereon computer executable instructions that, when executed the one or more processors of a first namespace manager, implement a method for migrating a namespace branch, the method comprising:
receiving a first namespace registration request from a provider to register a resource in a first namespace branch, the first namespace registration request including a namespace string that identifies the first namespace branch and a unique identifier for the provider requesting registration of the resource in the first namespace branch, the first namespace branch being one branch in a plurality of hierarchically-arranged namespace branches of a namespace tree that are managed by a plurality of namespace managers, each namespace branch corresponding to at least one resource within a hierarchical arrangement of a plurality of resources, each namespace branch being registered to a different corresponding provider of a plurality of providers;
determining that the first namespace manager has satisfied a policy action associated with a policy constraint based on a processing load of the first namespace manager and based on receiving the first namespace registration request;
identifying, based on determining that the namespace manager has satisfied the policy processing constraint, a second namespace branch that is being managed by the first namespace manager and that can be migrated to a partner second namespace manager of the plurality of namespace managers to, reduce the processing load of the first namespace manager so that the first namespace manager can meet the policy action associated with the policy constraint;
migrating the second namespace branch to the partner second namespace manager in response to the policy action, including migrating existing namespace registrations for the second namespace branch; and
subsequent to migrating the second namespace branch to the partner second namespace manager, the first namespace manager performing the following:
processing the first namespace registration request, to register the resource in the first namespace branch under the first namespace manager;
recording a stub indicating that the second namespace branch has been migrated to the partner namespace manager;
revoking one or more subscriptions for liveness notifications for tracking providers and subscribers in the migrated second namespace branch;
receiving a second namespace registration request to register a resource in the second namespace branch that was migrated; and
redirecting, based on the stub, the second registration request to the partner second namespace manager.

13. The computer system as recited in claim 12, further comprising: forwarding at least a portion of namespace registrations encountered along a spine of the migrated second namespace branch to the partner second namespace manager hosting the migrated second namespace branch, such that the partner second namespace manager is configured to service the lookup requests that specify the migrated second namespace branch without the requests having to go through the first namespace manager.

14. The computer system as recited in claim 12, wherein determining that the first namespace manager has satisfied the policy action associated with the policy constraint comprises determining that the amount of namespace information being processed at the first namespace manager has exceeded a configured threshold.

15. The computer system as recited in claim 14, wherein the configured threshold comprises a total number of registrations maintained at the namespace manager.

16. The computer system as recited in claim 12, wherein the second namespace branch is migrated to reduce the namespace information processed at the first namespace manager below a configured threshold.

17. The computer system as recited in claim 12, wherein the first namespace manager identifies a more heavily-populated or heavily-serviced namespace branch for migration.

18. The one or more hardware storage devices as recited in claim 8, wherein the configured threshold comprises a total number of registrations maintained at the namespace manager.

* * * * *